(12) United States Patent
Cohen

(10) Patent No.: US 10,299,444 B2
(45) Date of Patent: May 28, 2019

(54) IN LINE BUTTON DRIP EMITTER

(71) Applicant: Amir Cohen, Yuvalim (IL)

(72) Inventor: Amir Cohen, Yuvalim (IL)

( * ) Notice: Subject to any disclaimer, the term of this patent is extended or adjusted under 35 U.S.C. 154(b) by 0 days.

(21) Appl. No.: 15/480,404

(22) Filed: Apr. 6, 2017

(65) Prior Publication Data

US 2017/0290277 A1  Oct. 12, 2017

Related U.S. Application Data

(60) Provisional application No. 62/367,182, filed on Jul. 27, 2016, provisional application No. 62/319,663, filed on Apr. 7, 2016.

(51) Int. Cl.
*A01G 25/02*  (2006.01)

(52) U.S. Cl.
CPC .......... *A01G 25/023* (2013.01); *Y02A 40/237* (2018.01)

(58) Field of Classification Search
CPC ....... A01G 25/02; A01G 25/023; Y02A 25/02
USPC ................................... 239/542, 547
See application file for complete search history.

(56) References Cited

U.S. PATENT DOCUMENTS

| | | | |
|---|---|---|---|
| 3,667,685 A | 6/1972 | Rinkewich | |
| 4,209,133 A | 6/1980 | Mehoudar | |
| 4,210,287 A * | 7/1980 | Mehoudar | A01G 25/023 239/542 |
| 4,281,798 A | 8/1981 | Lemelstrich | |
| 4,366,926 A | 1/1983 | Mehoudar | |
| 4,369,923 A * | 1/1983 | Bron | B05B 1/3006 239/533.1 |
| 4,533,083 A | 8/1985 | Tucker | |
| 4,589,595 A * | 5/1986 | Havens | A01G 25/023 138/46 |
| 4,850,531 A | 7/1989 | Littleton | |
| 5,137,216 A | 8/1992 | Hanish | |
| 5,183,208 A | 2/1993 | Cohen | |
| 5,279,462 A | 1/1994 | Mehoudar | |

(Continued)

FOREIGN PATENT DOCUMENTS

| | | |
|---|---|---|
| WO | WO 92/05689 | 4/1992 |
| WO | WO 98/10635 | 3/1998 |

(Continued)

OTHER PUBLICATIONS

Applicant-Initiated Interview Summary dated Jun. 23, 2017 From the U.S. Patent and Trademark Office Re. U.S. Appl. No. 14/596,580, (3 pages).

(Continued)

*Primary Examiner* — Alexander M Valvis

(57) ABSTRACT

A drip irrigation emitter may be provided with a coupler for bonding to an inner surface of a conduit. The emitter may include for example a button flow restrictor. The coupler may optionally provide an outlet zone on the conduit surface that is large enough for automated perforation. Bonding the emitter to the surface of the conduit may have a minimal effect on the dimensions and/or properties of the conduit. A button drip irrigation emitter may optionally include a two part labyrinth. The labyrinth may for example be confined between a cylindrical surface and a cover and/or wind between intermeshing baffles on the cover and/or the surface. In some embodiments the device may be formed using molding elements moving along a single axis.

12 Claims, 12 Drawing Sheets

(56) References Cited

U.S. PATENT DOCUMENTS

| | | | |
|---|---|---|---|
| 5,294,058 A | 3/1994 | Einav | |
| 5,295,506 A | 3/1994 | Smith | |
| 5,443,212 A | 8/1995 | Dinur | |
| 5,636,797 A | 6/1997 | Cohen | |
| 5,820,028 A | 10/1998 | Dinur | |
| 6,027,048 A | 2/2000 | Mehoudar | |
| 6,206,305 B1 | 3/2001 | Mehoudar | |
| 6,250,571 B1 | 6/2001 | Cohen | |
| 6,302,338 B1 | 10/2001 | Cohen | |
| 6,481,645 B1 | 11/2002 | Taylor-McCune et al. | |
| 6,568,607 B2 | 5/2003 | Boswell et al. | |
| 6,698,629 B2 | 3/2004 | Taylor-McCune | |
| 7,270,280 B2* | 9/2007 | Belford | A01G 25/023 239/542 |
| 7,681,810 B2 | 3/2010 | Keren | |
| 8,141,589 B2 | 3/2012 | Socolsky | |
| 8,317,111 B2 | 11/2012 | Cohen | |
| 8,511,586 B2* | 8/2013 | Einav | A01G 25/023 239/542 |
| 9,022,059 B2* | 5/2015 | Cohen | A01G 25/023 137/315.05 |
| 9,307,705 B2* | 4/2016 | Akritanakis | A01G 25/023 |
| 9,462,760 B2 | 10/2016 | Cohen | |
| 2005/0284966 A1 | 12/2005 | DeFrank | |
| 2009/0212135 A1 | 8/2009 | Keren | |
| 2010/0237170 A1 | 9/2010 | Rosenberg et al. | |
| 2012/0012682 A1 | 1/2012 | Einav | |
| 2012/0097254 A1 | 4/2012 | Cohen | |
| 2012/0267454 A1* | 10/2012 | Einav | A01G 25/023 239/542 |
| 2013/0248616 A1 | 9/2013 | Ensworth et al. | |
| 2014/0246520 A1 | 9/2014 | Einav | |
| 2015/0012682 A1 | 1/2015 | Yang et al. | |
| 2015/0014446 A1* | 1/2015 | Cohen | A01G 25/02 239/542 |
| 2015/0289458 A1 | 10/2015 | Cohen | |
| 2016/0198643 A1 | 7/2016 | Cohen | |
| 2017/0020086 A1 | 1/2017 | Cohen | |
| 2018/0235161 A1 | 8/2018 | Cohen | |

FOREIGN PATENT DOCUMENTS

| | | |
|---|---|---|
| WO | WO 99/33571 | 7/1999 |
| WO | WO 2011/092557 | 8/2011 |
| WO | WO 2012/015655 | 2/2012 |
| WO | WO 2012/038766 | 3/2012 |
| WO | WO 2015/004652 | 1/2015 |
| WO | WO 2016/113739 | 7/2016 |

OTHER PUBLICATIONS

Communication Relating to the Results of the Partial International Search dated Apr. 7, 2016 From the International Searching Authority Re. Application No. PCT/IL2016/050045.

Examination Report dated Mar. 14, 2017 From the Australian Government, IP Australia Re. Application No. 2014288784, (2 Pages).

International Preliminary Report on Patentability dated Apr. 20, 2017 From the International Preliminary Examining Authority Re. Application No. PCT/IL2016/050045, (21 Pages).

International Preliminary Report on Patentability dated Jan. 21, 2016 From the International Bureau of WIPO Re. Application No. PCT/IL2014/050586.

International Search Report and the Written Opinion dated Nov. 5, 2014 From the International Searching Authority Re. Application No. PCT/IL2014/050586.

International Search Report and the Written Opinion dated Jun. 14, 2016 From the International Searching Authority Re. Application No. PCT/IL2016/050045.

Official Action dated Jan. 13, 2016 From the U.S. Patent and Trademark Office Re. U.S. Appl. No. 13/937,294.

Official Action dated Jul. 16, 2015 From the U.S. Patent and Trademark Office Re. U.S. Appl. No. 13/937,294.

Official Action dated May 17, 2017 From the U.S. Patent and Trademark Office Re. U.S. Appl. No. 14/596,580, (37 pages).

Official Action dated Jun. 29, 2016 From the U.S. Patent and Trademark Office Re. U.S. Appl. No. 14/746,868.

Restriction Official Action dated Apr. 6, 2016 From the U.S. Patent and Trademark Office Re. U.S. Appl. No. 14/746,868.

Restriction Official Action dated Apr. 16, 2015 From the U.S. Patent and Trademark Office Re. U.S. Appl. No. 13/937,294.

Restriction Official Action dated Feb. 22, 2017 From the U.S. Patent and Trademark Office Re. U.S. Appl. No. 14/596,580, (8 Pages).

Written Opinion dated Jan. 25, 2017 From the International Preliminary Examining Authority Re. Application No. PCT/IL2016/050045, (7 Pages).

Translation of Notification of Office Action dated Sep. 28, 2017 From the State Intellectual Property Office of the People's Republic of China Re. Application No. 201480039100.3, (14 pages).

Notice of Allowance dated Dec. 21, 2017 From the U.S. Patent and Trademark Office Re. U.S. Appl. No. 14/596,580, (19 pages).

Restriction Official Action dated Apr. 4, 2018 From the U.S. Patent and Trademark Office Re. U.S. Appl. No. 15/289,252, (7 pages).

Notification of Office Action and Search Report dated Sep. 28, 2017 From the State Intellectual Property Office of the People's Republic of China Re. Application No. 201480039100.3 and Its Summary in English, (14 pages).

Official Action dated Jul. 13, 2018 From the U.S. Patent and Trademark Office Re. U.S. Appl. No. 15/289,252, (46 pages).

Office Action dated May 31, 2018 From the State Intellectual Property Office of the People's Republic of China Re. Appliation No. 201480039100.3 and Its Translation of the Notification of Office Action Into English.

Translation dated Jul. 3, 2018 of Notification of Office Action dated May 31, 2018 From the State Intellectual Property Office of the People's Republic of China Re. Application No. 201480039100.3.

Notification of Office Action and Search Report dated May 31, 2018 From the State Intellectual Property Office of the People's Republic of China Re. Application No. 201480039100.3, (14 Pages).

Applicant-Initiated Interview Summary Dated Feb. 27, 2019 From the US Patent and Trademark Office Re. U.S. Appl. No. 15/289,252. (3 pages).

Notification of Office Action Dated Dec. 14, 2018 From the State Intellectual Property Office of the People's Republic of China Re. Application No. 201480039100.3 and its Summary in English. (14 pages).

Official Action Dated Jan. 18, 2019 From the US Patent and Trademark Office Re. U.S. Appl. No. 15/289,252. (21 pages).

* cited by examiner

IN LINE BUTTON DRIP EMITTER

RELATED APPLICATIONS

This application claims the benefit of priority under 35 USC § 119(e) of U.S. Provisional Patent Application Nos. 62/319,663 filed on Apr. 7, 2016, and 62/367,182 filed on Jul. 27, 2016 the contents of which are incorporated herein by reference in their entirety.

FIELD AND BACKGROUND OF THE INVENTION

The present invention, in some embodiments thereof, relates to an in hose drip emitter and, more particularly, but not exclusively, an in hose drip emitter having an efficiently shaped and/or efficiently molded regulator.

International Patent Application Publication No. WO/1992/005689 to Dermitzakis discloses "an irrigation pipe with dripping elements soldered to its inner side made of a continuous plastic pipe which does not have however a constant cross-sectional area over its whole length. The dripping element may be designed either as a simple meander or other channel shape or have a pressure-compensating function. In the embodiment with pressure-compensating function, a constant water outflow rate from the dripping element is ensured within a determined pressure range. The dripping elements are successively introduced into the pipe during the production phase of the latter, are enveloped by the sheath of the pipe and secured to the inner wall of the pipe. The sheath of the pipe forms outer bulges at these locations. The cross-section of the irrigation pipe remains absolutely free over its whole length. The dripping element may also be provided with a small water outlet pipe which clearly projects from the outer side of the pipe."

U.S. Pat. No. 7,270,280 to Belford discloses "an integral in-line dripper to be used bonded to the internal surface of an irrigation pipe. The dripper has an inlet facing the inside of the pipe and an outlet connected to an exit opening in the pipe wall. The dripper has a flattened shape defined between a first surface with an open meandering channel formed therein, the channel's inlet being connected to the dripper's inlet, and a second surface opposite the first surface. The topography of the first surface is so designed that the dripper can be bonded to the internal surface of the pipe in any orientation about a radius of the pipe passing through the first and the second surface, so as to form a flow-restriction labyrinth connected to the outlet of the dripper."

U.S. Pat. No. 5,636,797 to Cohen discloses "a drip irrigation emitter including a tube having a plurality of flow control units bonded to its inner face providing a flow control passageway between the interior of the tube and each of a plurality of discharge openings formed through the wall of the tube. Each flow control unit includes a body member bonded to the inner face of the tube, a cover also bonded to the inner face of the tube, and a deformable elastomeric membrane between the body member and cover and defining a pressure-compensated flow control passageway through the flow control unit. A drip irrigation emitter includes a body member having an inlet for receiving pressurized water, an outlet, and a connecting passageway having a plurality of baffles spaced from each other in the direction of the water flow from the inlet to the outlet to define a labyrinth flow path cooperable with a deformable membrane which regulates the flow through the labyrinth flow path in response to the inlet pressure. The baffles are formed with notches in the sides thereof facing the membrane such that the membrane is deformed by an increase in the inlet pressure first into engagement with the sides of the baffles facing the membrane, and then into the notches, to regulate the flow to the outlet." According to Cohen, "The inner face of body member 10 (i.e., the face exposed to the interior of tube 2) is formed with a flat outer rim 13 (FIGS. 5A-H) of generally rectangular configuration for seating the cover 30. The longitudinal side sections 34, 35 of cover 30 are further formed with curved surfaces 34b, 35b, conforming to the curvature of tube 2."

U.S. Pat. Nos. 6,206,305 and 6,027,048 to Mehoudar disclose "an emitter unit to be integrally bonded to an internal surface of a conduit and comprising an elongated housing, a housing inlet adapted to communicate with an interior of said conduit and a housing outlet adapted to communicate with a conduit outlet. An elongated, flow-restricting flowpath is formed in the housing having a flowpath inlet communicating with the housing inlet and a flowpath outlet communicating with the housing outlet. A resiliently flexible membrane is mounted in the housing which is of closed box-like shape and is constituted by an elongated receiving member and a correspondingly elongated cover member. Projections and recesses are formed along the lengths of elongated rim portions of the members and are directed substantially transversely to longitudinal axes of said members such that projections of one member are adapted to form a close pressure fit within corresponding recesses of the other member."

U.S. Pat. No. 5,279,462 to Mehoudar discloses an "irrigation emitter unit comprising an outer member of substantially cylindrical shape and having a tapering base portion with fluid flow coupling means; an inwardly directed peripherally flanged edge portion of the outer member; an inner member having a body portion of substantially cylindrical shape substantially sealingly fitted within the outer member and having a cover portion formed integrally therewith; a peripheral edge portion of the cover portion juxtaposed below the flanged edge portion of the outer member; an elongated groove formed in the cylindrical surface of the body portion; a cavity formed in the body portion and communicating at one end thereof with a fluid flow inlet; an inwardly directed flange formed integrally with the walls of the cavity; and a resiliently flexible membrane located within the unit."

U.S. Pat. No. 4,209,133 to Mehoudar discloses "a drip level irrigation emitter unit having flow restricting means, a control mechanism, inlet and outlet control chambers of the control mechanism, resiliently flexible membrane sealingly separating the control chambers, the membrane being displaceable with respect to the flow restricting means, the inlet and outlet chambers respectively communicating with an inlet and an outlet of the flow restricting means, the outlet chamber being formed with an outlet aperture of substantially smaller area than that of the membrane, the arrangement being such that upon the liquid pressure in the inlet chamber exceeding the liquid pressure in the outlet chamber by a predetermined amount, the membrane flexes elastically towards the outlet aperture so as to define, with a rim of the aperture, a restricted outflow path thereby limiting variations in the outflow rate."

U.S. Pat. No. 7,681,810 to Keren discloses "an emitter comprising: a plurality of inlet apertures through which liquid enters the emitter; a manifold flow channel into which liquid that passes through the apertures flow; an elastic diaphragm that seats on the manifold flow channel; an outlet aperture through which liquid that enters the emitter exits the emitter; wherein liquid that enters the inlet apertures displaces only a portion of the diaphragm from the manifold channel so that the liquid can leave the manifold channel and flow through the emitter to reach the outlet aperture."

U.S. Patent Application Publication No. 2012/0097254 to Cohen discloses "an apparatus for a self-adjusting regulator suited for an irrigation emitter. A curved flow channel is integrated into a concave dome shaped surface. A deformable member deforms to approach the surface to adjust the resistance to flow. The concave dome shaped surface may match a deformed shape of the membrane. Irregularities in the interface between the surface and the deformable member are configured to achieve a desired discharge under varying flow conditions. The deformable member may activate an inlet filter cleaner by pushing a ram and thereby unclogging the filter."

SUMMARY OF THE INVENTION

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

According to an aspect of some embodiments of the invention, there is provided an inline dripper including: a cylindrical body having a longitudinal axis and including at an upper end thereof an attachment surface perpendicular the longitudinal axis; the attachment surface shaped and sized for attachment to an inner wall of an irrigation conduit; a first wall surrounding an outlet chamber on the upper end of the body; an upper edge of the first wall included in the attachment surface; a second wall below the first wall surrounding a regulator chamber; the second wall including an opening between the outer side of the cylindrical body and the regulator chamber; a portion of the first wall above the opening being thicker than a portion of the second wall below the opening; a hollow shaft passing through the first wall from the attachment surface to the opening in the second wall, the hollow shaft separated from the outlet chamber by the first wall.

According to some embodiments of the invention, the dripper further includes: a first set of teeth projecting laterally outward from an outer side of the cylindrical body with spaces between teeth of the first set of teeth facing the lower end of the body, the lower end opposite the upper end.

According to some embodiments of the invention, the dripper further includes: a cap including a cylindrical hollow fitting over the lower end of the cylindrical body; the cap including a second set of teeth projecting inward from a side wall of the cylindrical hollow with spaces between teeth of the second set of teeth facing upward when the hollow is positioned over the lower end of the cylindrical body; and wherein when the cap is positioned over the lower end of the cylindrical body, the opening provides fluid communication between the regulating chamber and a space between the first set of teeth and the second set of teeth.

According to some embodiments of the invention, the dripper further includes: An inlet in the cap allowing water from the conduit to enter the hollow of the cap and reach the space between the first set of teeth and the second set of teeth. According to some embodiments of the invention, the dripper further includes: a filter in the inlet having opening sized to permit water to pass through the inlet while preventing particles from passing through the inlet.

According to some embodiments of the invention, the dripper further includes: a membrane sized and shaped to fit between a bottom edge of the second wall and the cap; the membrane preventing short circuiting of water passing through to the regulating chamber without passing through the space between the first set of teeth and the second set of teeth.

According to some embodiments of the invention, the dripper further includes: a first orientation element on the body and a second orientation element on the cap wherein an alignment of the first orientation element with the second orientation element indicates an alignment of the first set of teeth with the second set of teeth. According to some embodiments of the invention, the dripper further includes: an orientation indicator on an outer surface of the cap indicating an orientation of the cap around a longitudinal axis of the cylindrical hollow; a further attachment surface on the cap shaped and sized for attachment to an inner wall of an irrigation conduit when the attachment surface of the body is attached to the inner wall and the cap is positioned over the lower end of the cylindrical body.

According to some embodiments of the invention, the further attachment surface surrounds at least 20% of a circumference of the body when the cap is positioned over the lower end of the cylindrical body.

According to some embodiments of the invention, the further attachment surface surrounds no more than 60% of a circumference of the body when the cap is positioned over the lower end of the cylindrical body.

According to an aspect of some embodiments of the invention, there is provided an in-line agricultural emitter including: an outlet face configured for attachment to an inner surface of an irrigation conduit; the outlet face including a first region and an second region; a wall defining an inner chamber of the emitter; the inner chamber in fluid contact with the first region of the outlet face; a passageway through the wall; a flow path in fluid contact with the inner chamber through the passageway; the flow path including a closed conduit formed in the emitter; an access channel leading from the second region of the outlet face to the passageway in the wall; a sealing surface on the outlet face configured for sealing to the inner surface of the irrigation conduit; the sealing surface separating between the first region and the second region such that when the sealing surface is sealed against the inner surface of the irrigation conduit, every fluid path from the second region to the first region goes through at least one of the flow path and the passageway.

According to some embodiments of the invention, the flow path is configured to reduce pressure of flow passing through the flow path into the passageway. According to some embodiments of the invention, the flow path includes a pressure reducing labyrinth.

According to some embodiments of the invention, when the sealing surface is sealed against the inner surface of the irrigation conduit, every fluid path from the access channel to outside the agricultural emitter goes through at least one of the flow path and the passageway.

According to some embodiments of the invention, when the sealing surface is sealed against the inner surface of the irrigation conduit, every fluid path from the second region to the first region goes through the passageway.

According to an aspect of some embodiments of the invention, there is provided an agricultural emitter including: a divider separating an input path from an outlet chamber; an opening through the divider; an access channel from a bonding surface to the opening such that when the bonding surface is sealed to an inner surface of an irrigation conduit, the opening forms a closed passageway providing fluid communication between an inlet path and an outlet of the emitter.

According to some embodiments of the invention, the access channel is straight.

According to some embodiments of the invention, the communication between the inlet path and the outlet passes through an outlet chamber.

According to some embodiments of the invention, the communication between the inlet path and the outlet includes a regulating chamber in fluid communication with the outlet chamber and wherein the divider separates between the regulating chamber and the input path and the passageway is between the regulating chamber and the input path.

According to some embodiments of the invention, the inlet path includes a pressure reducing path.

According to some embodiments of the invention, the pressure reducing path includes a labyrinth flow path.

According to some embodiments of the invention, the agricultural emitter further includes a cylindrical core and wherein fluid communication between the inlet path and the outlet of the emitter passes axially through the core.

According to some embodiments of the invention, the inlet path at least partially encircles an outer wall of the core.

According to some embodiments of the invention, the agricultural emitter further includes a cover, the cover at least partially surrounding the outer wall of the core and enclosing the inlet path.

According to some embodiments of the invention, the agricultural emitter further includes a cylindrical core and wherein the regulating chamber includes an open face on one end of the core.

According to some embodiments of the invention, the agricultural emitter further includes a flexible membrane closing the open face of the regulating chamber such that increasing external fluid pressure displaces the membrane increase flow resistance in the regulating chamber.

According to some embodiments of the invention, the inlet path includes a pressure reducing path that least partially encircles an outer wall of the core.

According to some embodiments of the invention, the agricultural emitter further includes a cover and the cover at least partially surrounds the outer wall of the core; the cover enclosing the pressure reducing path.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1A:
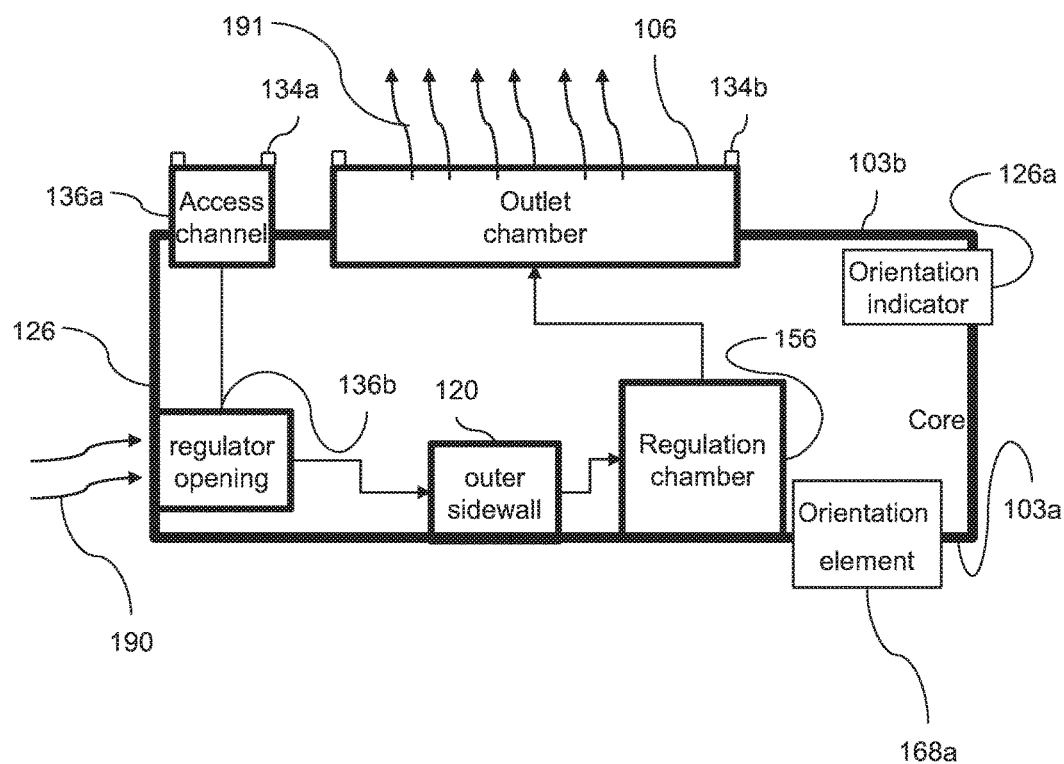
FIG. 1A is a block diagram illustrating a drip emitter core in accordance with an embodiment of the present invention.

The present invention, in some embodiments thereof, relates to an in hose drip emitter and, more particularly, but not exclusively, an in hose drip emitter having an efficiently shaped and/or efficiently molded regulator configured for simple molding.

Overview

An aspect of some embodiments of the current invention relates to a molded flow control device and a simplified method of molding a complex device. For example, a device including passageways directed in various and/or perpendicular directions may be molded by moving molding elements along a single axis. For example, the device may be formed in a cavity between two molding elements. Optionally a first face of the device may be formed by a first of the two elements and a second opposite face may be formed by the second element.

In some embodiments, a molded component of the dripper is removed from a molding element without straining the component and/or the mold element. For example, the component may be removed from the mold without stripping an undercut. For example the component may be removable from the mold without flexing of the mold and/or the component. For example, the molded component may not include an undercut formed by a protrusion of a molding element. Optionally, the molding element may be straight. As used herein a straight molding element may have a taper, but will not have an overhang (for example a lateral protrusion and/or hook and/or a barb) that forms an undercut that blocks removal of the overhang. Optionally, all movement directions may be parallel to a single axis.

In some embodiments, a molded component may have an axis. For example, the axis may be parallel to a direction of movement of mold parts used to form the component. Optionally, a feature of the component may be formed without an undercut. For example, the surfaces of the component may be an end face of the component and/or may be parallel to the axis of the component. For example, an end face of the component may have an uninterrupted direct path past the end of the component. For example, the direct path may be parallel to the axis of the component and/or the molding direction.

In some embodiments, a projection of the first molding element may project into a feature formed in the second face. For example, the projection may form a passageway including an opening and/or a hole and/or flow path in the second face. Optionally, the projection may form a hollow and/or void in the first face. For example the void may be a missing section of a feature in the second face. Optionally, an inner face of the void may face the first end of the component. For example, the face of the void may have a clear line of site through a molding access channel out the first face of the component.

In some embodiments, after molding, the access channel may be sealed against a surface. For example, the first face may be sealed against a surface such as the inner surface of an irrigation conduit. Optionally the inner face of the irrigation conduit will seal off the aperture in the feature of the second face from the side of the first face. Optionally a feature of the first face is wide enough to surround the access channel on four sides such that the void is internal to that feature.

In some embodiments a button drip regulator is molded by molding elements moving in relation to each other along a single axis. Optionally, a molding element inserted through one face forms an opening and/or a passageway in a feature of an opposite face. The opening and/or passageway is directed in a different and/or perpendicular direction to the direction of movement of the molding elements. For example, a molding element moving along a superior/inferior axis may form a passageway along a lateral and/or dorsal/axis.

In some embodiments, this method may be used to form an opening in the wall of a regulating chamber. For example the opening may supply fluid communication between the regulating chamber and an inlet channel. For example, the inlet channel may include a pressure reducing path and/or a labyrinth flow path. For example, the inlet channel and/or labyrinth flow path and/or pressure limiting flow path may include a closed conduit. Optionally, the conduit may be formed in one component of the dripper and/or between two components of the dripper. Optionally the inlet flow path and/or closed conduit may be formed in the dripper independent of an irrigation conduit, for example independent of connection of the dripper to the wall of the irrigation conduit. For example, the input flow path may include labyrinth flow path surrounded a cylindrical body of a dripper. For example a drip emitter may have two opposite faces and a longitudinal axis between them. For example, an outlet face may include a fluid outlet chamber and the second opposite inlet face may include a regulation chamber. For example, an opening may be formed in a wall of the regulation chamber. Mean flow in the opening optionally is directed perpendicular to the longitudinal axis. Optionally a molding element forming the opening is inserted through the outlet side of the core into the base of a wall of the regulating chamber, for example to form a hole (e.g. a channel opening) in the base of the wall of the regulating chamber. Optionally, space separates the molding element forming the outlet chamber and the molding element forming the channel outlet opening. Optionally this space is filled with resin during molding. For example the resin forms a wall separating the void and/or opening from the outlet chamber of the regulator.

In some embodiments, a drip emitter may include multiple inlet paths. Optionally, each inlet path may have separate passageway into a regulation chamber. Alternatively or additionally, multiple inlet pathways may communicate with the regulation chamber through a single passageway.

In some embodiments, a hole may be formed in any part of drip emitter and/or any kind of drip emitter. For example a width of a hole (e.g. the width of the hole making protrusion) may range between 0 to 0.1 mm and/or between 0.1 to 0.2 mm and/or between 0.2 to 0.5 mm and/or between 0.5 to 1.0 mm and/or between 1.0 to 2.0 mm and/or between 2 to 4 mm and/or between 4 to 8 mm and/or 8 to 16 mm. For example a height of a hole (e.g. the depth to which the protrusion was inserted into the object) may range between 0 to 0.1mm and/or between 0.1 to 0.2mm and/or between 0.2 to 0.5 mm and/or between 0.5 to 1.0 mm and/or between 1.0 to 2.0 mm and/or between 2 to 4 mm and/or between 4 to 8 mm and/or 8 to 16 mm.

An aspect of some embodiments of the current invention relates to an in hose agricultural emitter including an undercut feature removed from a mold without stripping and/or flexing. Optionally, the undercut feature is formed by a shutoff. For example, the shutoff may access the undercut through an access channel. For example, the access channel may include a shutoff window. The shutoff optionally includes a mold projection. The shutoff window and/or the access channel is optionally open to a bonding face of the emitter. For example, the bonding face may be configured to bond to an inner surface of an irrigation conduit. The inner surface of the irrigation conduit optionally seals the access channel. Alternatively or additionally, the inner surface of the irrigation conduit limits access to the access channel. For example, sealing the bonding surface to the inner surface of the irrigation conduit limits access to the undercut feature. For example, after sealing the boding face to the inner wall of the conduit, the undercut feature may form a closed passageway between an inlet path and an outlet of the emitter.

In some embodiments an agricultural emitter includes a feature formed with at least two external faces open to a first direction and an undercut having an internal face open to a second direction opposite the first direction. The emitter optionally includes a bonding surface facing the second direction. The bonding surface optionally defines two regions. For example, when the bonding surface is sealed to an inner surface of an irrigation hose, all paths between the first region and the second region may pass through the undercut. Alternatively or additionally, in the assembled emitter, the undercut may form a passageway between in an inlet flow path and the second region. When the assembled emitter is sealed to an inner wall of an agricultural conduit, all flow paths between the first region and the second region may pass through either the inlet flow path or the passageway. Optionally an agricultural admitter may include an irrigation emitter.

In some embodiments, the inner wall of the agricultural conduit closes and/or seals the passageway. For example, when the sealing surface is sealed to the inner wall of the hose, the passageway may channel fluid between the inlet flow path and the second region. For example, the passageway main include a closed channel. Optionally, the second region is in fluid contact with an outlet chamber of the emitter. The passageway may server as a conduit between the inlet path and the outlet chamber. Optionally the inlet path includes a pressure reducing path. For example, the inlet path may include a labyrinth flow path.

In some embodiments, the feature having two faces open to a first direction may include a divider. Optionally, the undercut includes a passageway short circuiting and/or crossing the divider. For example, when the sealing surface of the emitter is sealed to a wall of the agricultural conduit, the wall of the conduit may close the passageway to form a closed conduit. For example, the divider may separate between an inlet path and an outlet chamber. Optionally, the passageway may be open at one point to the inlet path and/or at another point to the outlet chamber. The passageway is optionally also in fluid communication with the second region. Optionally, when the sealing surface is sealed to an inner surface of an irrigation conduit the passageway has no opening except for the opening to the inlet path and the opening to the outlet chamber. Optionally the outlet chamber is sealed around a hole in the side of the irrigation conduit. Optionally the inlet path is open to the inside of the irrigation conduit. For example fluid from inside the agricultural conduit may enter the inlet path, pass through the passageway into the outlet chamber and pass out through the hole in the wall of the irrigation conduit.

The invention as described herein may include a method to make a passageway and/or an opening in a molded device. The passageway and/or opening may be in various parts of a drip emitter. For example a hole may be formed in a sidewall of an input chamber and/or an outlet chamber. A hole may be formed at a high angle to and/or perpendicular to an axis of movement of a molding element. The methodology may be used to form all kinds of drippers and/or emitter for example as listed below.

Exemplary Embodiments

FIG. 1A is a block diagram illustrating a flow emitter body in accordance with an embodiment of the present invention. In some embodiments, a complex pattern of flow paths is formed in a single integrally molded structure. For example, the body may be formed by molding elements that move along a single axis. For example, an emitter body may include conduits directed at different angles and/or perpendicular to one another.

In some embodiments, a body 126 may include an inlet face 103*a*, an outlet face 103*b* and/or an axis running between inlet face 103*a* and outlet face 103*b*. Optionally a regulation chamber 156 is formed in inlet face 103*a*. Regulation chamber 156 optionally includes an outer side wall 120 parallel to the axis of body 126 and a regulator opening 136*b* through outer side wall 120. For example flow 190 may pass perpendicular to the axis of the body along opening 136*b* through wall 120 into chamber 156. An access channel 136*a* optionally connects between outlet face 103*b* and opening 136*b*. For example, access channel 136*a* may be parallel to the axis of body 126.

In some embodiments, an outlet face of body 126 may include an outlet chamber 106. Optionally outlet face 103*b* is sealed to a wall of an irrigation hose. For example an outlet edge of access channel 136*a* may be surrounded by a sealing surface 134*a* adapted to seal to the inner wall of the hose. For example, when sealing surface 134*a* is sealed to an inner wall of a hose, the wall of the hose may block flow out of channel 136*a* through outlet face 103*b*. When sealed to the hose wall, access channel 136*a* is optionally isolated from outlet chamber 106 and/or from flow inside the irrigation hose. In some embodiments, all flow entering regulator opening exits into regulator chamber 156.

In some embodiments, an outlet edge of outlet chamber 106 may be surrounded by a sealing surface 134*b* adapted to seal to the inner wall of the hose. For example, outlet chamber may be sealed around a hole in a hose wall. For example, fluid entering outlet chamber 106 may pass out of the hole in the hose wall as outlet flow 191.

Figure 1B:
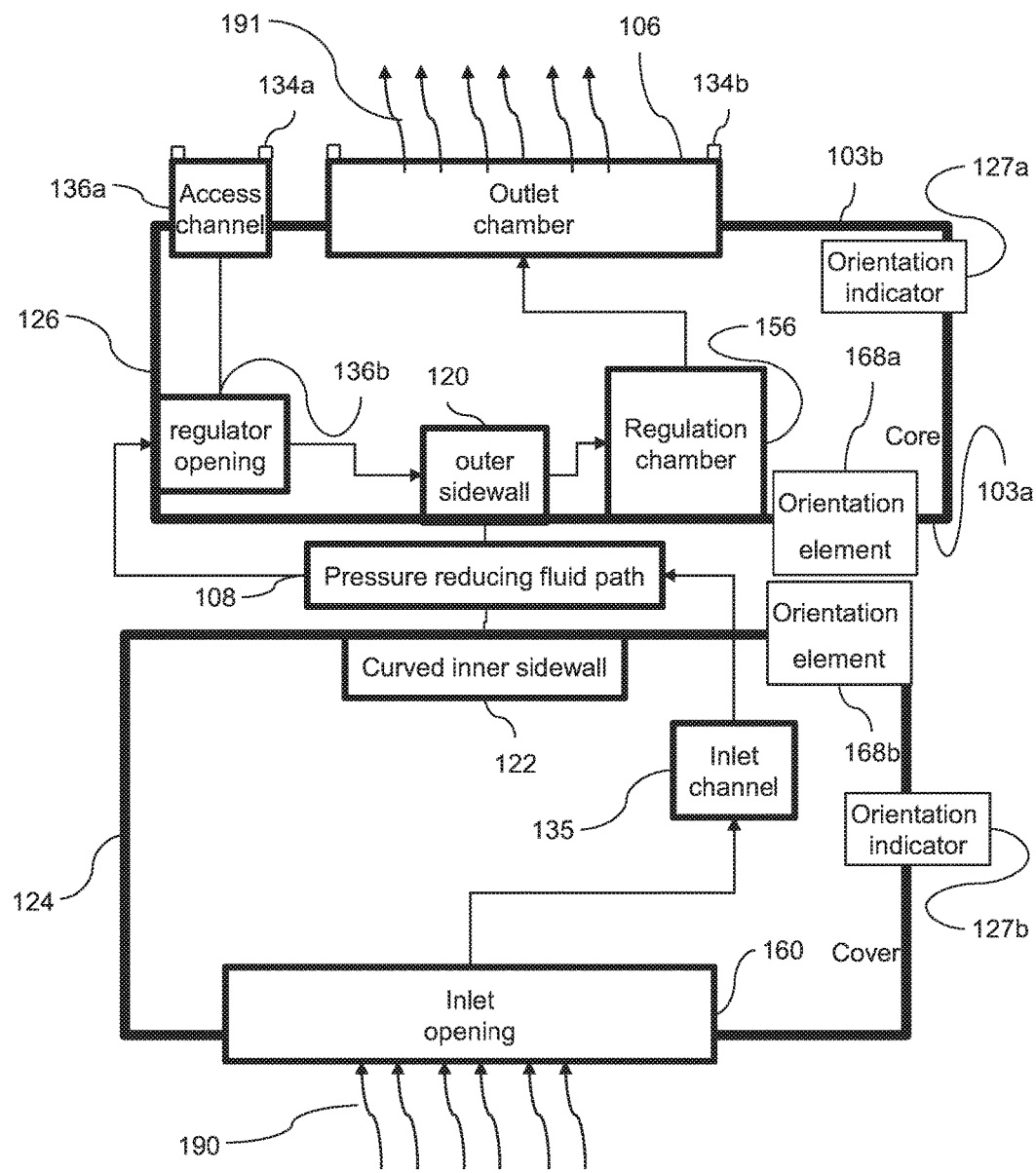
FIG. 1B is a block diagram illustrating a drip emitter in accordance with an embodiment of the present invention.

FIG. 1B is a block diagram illustrating a flow emitter in accordance with an embodiment of the present invention. In some embodiments, body 126 may be installed into a cover 124. For example, fluid flow 190 may enter regulation opening 136*b* of body 126 through cover 124.

In some embodiments, the flow emitter includes a pressure reducing flow path 108 that is wrapped around an outer wall 120 of the emitter body. For example, path 108 may be confined on one side by an inner surface 122 of cover 124 and on an opposite side by and outer wall 120 of body 126.

In some embodiments, a fluid path may include for example a channel inlet 135 leading to path 108. Path 108 may optionally lead to regulator opening 136*b*. Regulator opening 136*b* optionally leads in turn to a regulator. For example a regulator may include a chamber 156. For example, flow in regulator chamber 156 may cross a regulating surface and exit to outlet chamber 106. In some embodiments, a mobile and/or flexible element (for example an flexible membrane) reacts to pressure in the hose increasing and/or decreasing the size of the flow path across the regulating surface and/or controlling flow resistance in regulator chamber 156.

Optionally cover 124 includes an inlet opening 160. For example, inlet opening 160 may include a fluid path for inlet flow 190 between pressurized fluid in a hose and an inlet channel 135 of the emitter. Optionally inlet opening 160 includes a filter.

When fitting surfaces 134*a* and/or 134*b* of the emitter to an inside surface of a hose, it may optionally be desirable to align the emitter to the conduit. Alternatively or additionally, it may be desired to align cover 124 to body 126 for example during assembly. Alternatively or additionally, an emitter may include an orientation locking element. For example, interlocking elements such as an orientation locking element 168*a* on body 126 and/or an orientation element 168*b* on cover 124. Optionally elements 168*a* and 168*b* may interlock when cover 124 is aligned to body 126 and/or lock cover 124 into alignment with body 126. Alternatively or additionally, in some configurations, orientations elements 168*a* and/or 168*b* may hinder assembly of the dripper when cover 124 is not properly oriented to body 126. A conventional button drip emitter may have external symmetry and/or may lack an obvious external feature by which to judge the orientation of the emitter. Some embodiments of the present invention may include an orientation indicator 127*a* on body 126 and/or an orientation indicator 127*b* on cover 124. For example, a flat surface serves may serve as an alignment indicator 127*a* and/or 127*b*.

In some embodiments, a cylindrical element regulated button type flow emitter may be self-contained. For example the restricting properties of the emitter may be independent its connection to the conduit. The emitter may optionally have a main axis that is substantially perpendicular to axis of curvature of the hose to which it is attached. For example the angle between axis of the dripper and the axis of the hose may be 90°±10°.

In some embodiments, a bonding zone of an emitter to a hose wall may have an angular extent, for example, of less than 45° around the inner circumference of the hose. Alternatively or additionally, in some embodiments, the angular extent of the bonding zone may be between 20° and 180°.

Alternatively or additionally, in some embodiments, the angular extent of the bonding zone may be greater than 180°.

Cross Section Views of an Emitter Installed in a Conduit

Figure 2:
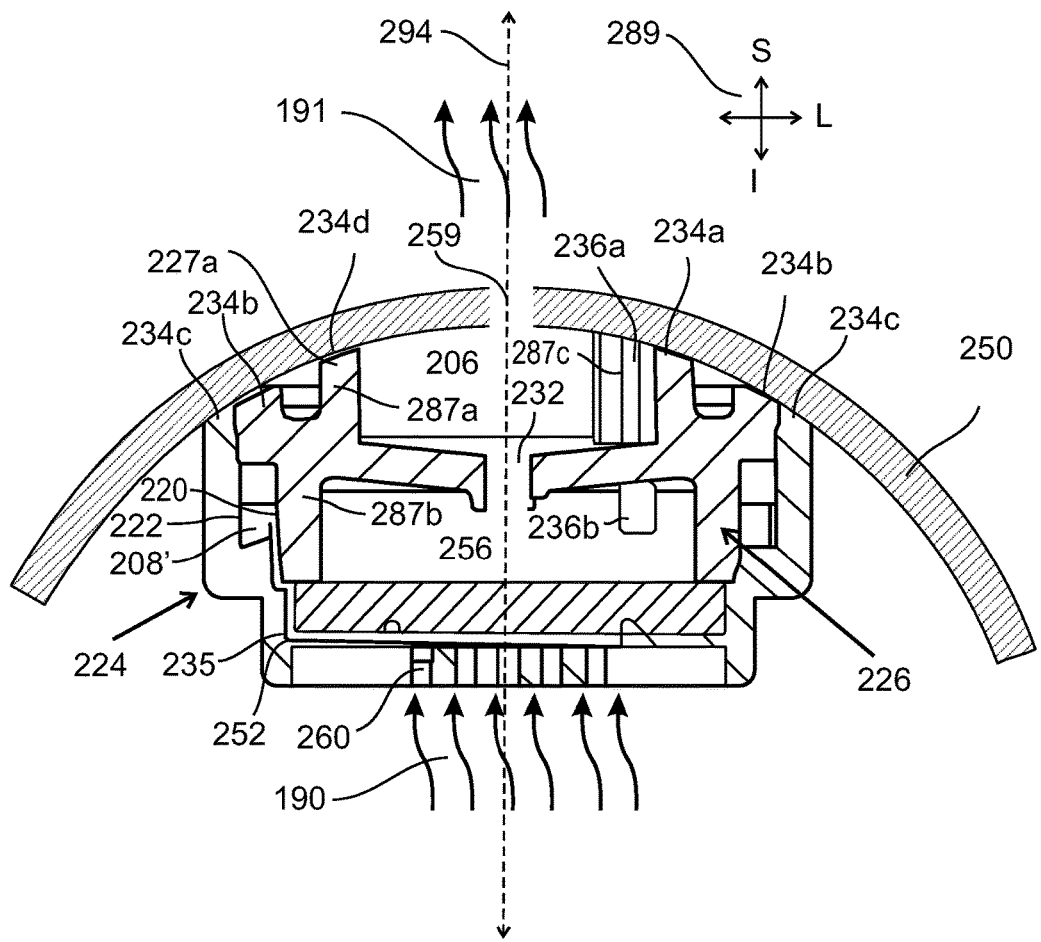
FIG. 2 is a transverse cross section view of a hose including an exemplary drip emitter in accordance with an embodiment of the present invention.

FIG. 2 is a frontal plane cross section view (cut on plane A-A' of FIG. 11) of an emitter with an input attachment installed in a conduit (FIG. 2 is along a transverse cross section of the hose) in accordance with an embodiment of the present invention. In some embodiments, the emitter may include an outlet face (for example on a superior face) configured to be attached to a wall of an irrigation hose 250. Optionally, opposite the outlet face is an inlet face including a fluid inlet 260. In some embodiments, an emitter may include a cover 224 and/or a body 226.

An exemplary set of axes 289 is illustrated. For example the superior (S), inferior (I) and lateral (L) directions are labeled. The dorsal (D) and ventral (V) directions are marked for example in axes 289 of FIG. 3. All of the axes 289 are labeled for example in FIG. 6A.

In some embodiments, a pressure reducing fluid pathway 208', 208" circles around all and/or part of body 226. Optionally, pathway 208', 208" is confined between inner curved surface 222 of a cover 224 and an outer curved surface 220 of body 226. For example, pathway 208', 208" may be a closed conduit formed by the dripper (for example between cover 224 and body 226. For example, pathway may be complete and/or closed (optionally except at the end openings) independent of whether the dripper is connected to an irrigation conduit. For example, flow may enter pathway 208' from a fluid inlet 260 through an inlet channel 235. Flow optionally passes out of the page (towards the viewer) and around the near portion of the pathway and back into the page (away from the viewer) at 208". Flow at section of pathway 208" optionally passes back into the page and behind the emitter until it comes to a channel outlet opening passageway 236b. Optionally, passageway 236b is a passageway for fluid at an angle (for example perpendicular) to an axis of motion of a molding element. For example, fluid passes from the pressure reducing pathway 208', 208" through opening 236b into a regulator chamber 256. Pathway 208', 208" is optionally bounded on the inferior side by a sealing ring 244 of cover 224. Pathway 208', 208" is optionally bounded on the superior side by a sealing ring 245 of body 226. For example sealing ring 244 may seal against outer curved surface 220 of wall 287b and/or sealing ring 245 may seal against inner curved surface 222 of cover 224. Optionally a divider separates and/or prevents short circuit flow between the section of flowpath 208' and opening 236b.

In some embodiments, body 226 is formed in a single molding step using molding elements moving along a single axis. For example, opening 236b which runs laterally through wall 287b may be formed by a molding element moving along the longitudinal axis 294 (in the superior and/or inferior directions) of the emitter. Optionally the molding element may pass through an access channel, for example, a shaft 236a from the outlet side of the emitter.

In some embodiments, a periphery of outlet chamber 206 and/or shaft 236a may be configured for sealing an inner wall of a hose 250. For example the periphery may be shaped and sized to fit against the inner wall of the conduit. For example, the assembly may be attached to inner wall of the conduit over less than half a circumference thereof. Optionally, shaft 236a may have two openings. For example, first opening may be to opening 236b. For example, a second opening may be to an output face of the emitter that is positioned and/or shaped to be sealed against the inner wall of hose 250. Optionally, when the outlet face of the emitter is sealed to the inner wall of hose 250, shaft 236a may be isolated except for opening 236b between fluid pressure reducing flowpath 208" and regulation chamber 256. For example, shaft 236a may be isolated from outlet chamber 206 and/or the outside of hose 250 and/or from flow inside hose 250. Optionally, when the outlet face of the emitter is sealed to the inner wall of hose 250, fluid entering opening 236b from pathway 208" may exit opening 236b substantially only to regulation chamber 256.

In some embodiments, a structure may be isolated on one portion and open on another portion. For example, an outlet portion of a wall 287c may be thicker than an inlet portion of the wall 287b. A shaft 236a is optionally surrounded by a thick wall 287c and/or be isolated on the inlet portion of wall 287c and/or form an opening through a thin wall 287b and/or on an inlet portion of wall 287b. Alternatively or additionally, a feature may only partially traverse a thin portion of a wall. For example, an opening may be formed in one side of a wall, but not traverse the wall. Alternatively or additionally, a complex structure may be produced by partially penetrating and/or intersecting holes in walls of differing thickness.

In some embodiments, cover 224 and/or body 226 may have a cylindrical form. For example cover and/or body may be coaxial around a shared axis 294. In some embodiment cover 224 may optionally snap onto the body 226. Optionally, an outlet face of body 226 may include an outlet chamber 206. Outlet chamber 206 optionally includes an open faced indentation. The open face of outlet chamber may be sealed against a wall of a conduit 250. Optionally a hole 259 in the wall of conduit 250 may outlet flow 191 from outlet chamber 206 to outside the conduit.

In some embodiments, regulatory chamber is formed as an open indentation on an outlet face of body 226. An optional flexible membrane 252 covers and/or seals the open face of chamber 256. Optionally, membrane 252 controls flow resistance of the regulator. For example, in FIG. 2, fluid in the conduit is not under high pressure and therefore pressure at inlet 260 does not displace membrane 252 into regulating chamber 256. Optionally, fluid can flow freely across regulator chamber 256 to an outlet 232 under low inlet pressure. As pressure in the conduit rises, membrane 252 optionally increases flow resistance regulator chamber 256. For example, membrane 252 is displaced inward partially blocking flow from regulator chamber 256 to regulator outlet 232. For example, by increasing resistance of regulatory chamber 256 as input pressure increases the regulator may maintain more constant flow output.

In some embodiments inlet opening 260 provides fluid communication between fluid in the conduit and the inside of flow restrictor. For example, a flow path may pass along inlet channel 235 through pressure reducing channel 208', 208". The flow path may optionally pass from pressure reducing channel 208', 208" to an opening 236b and/or to a regulator, for example regulation chamber 256. Optionally, membrane 252 is sized and shaped to be sandwiched between cover 224 and body 226. For example, membrane 252 may fit between an inlet edge of wall 287b and cover 224. Optionally membrane 252 seals over the open face of regulation chamber 256 preventing short circuiting of water passing through inlet 260 to the regulating chamber 256 without passing through pressure reducing labyrinth 208', 208".

Figure 3:
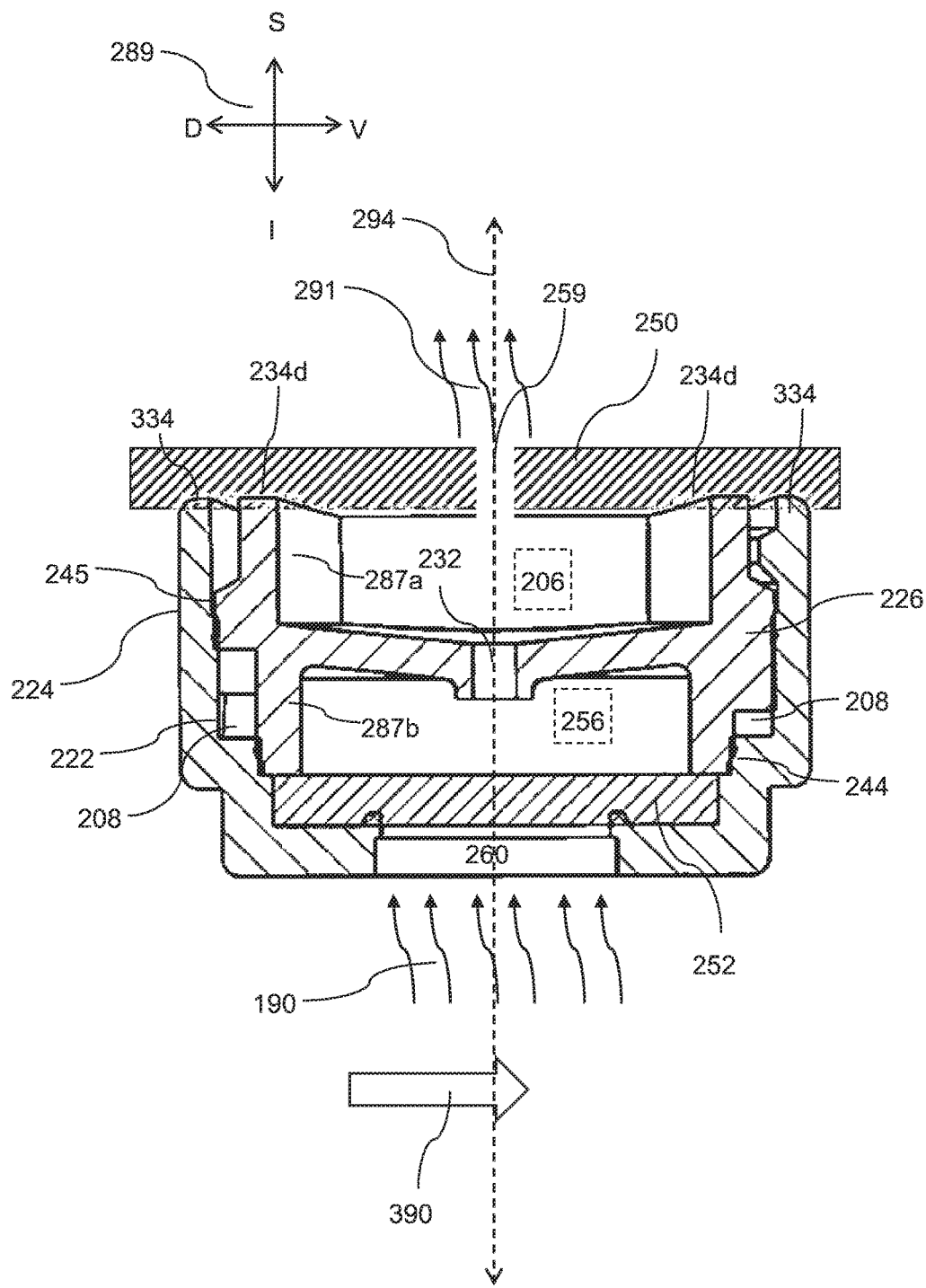
FIG. 3 is a lateral cross section view of a hose including an exemplary drip emitter in accordance with an embodiment of the present invention.

FIG. 3 illustrates a medial plane cross sectional view (cut on plane B-B' of FIG. 11) of an exemplary embodiment of an emitter installed in a conduit 250 (FIG. 3 is along a lateral cross section of the conduit). The cross section is illustrated along the axis of conduit 250, for example the prevailing flow in the conduit is in the direction of arrow 390. Optionally, conduit 250 includes an irrigation hose.

In some embodiments, cover 224 includes a bonding surface 334. For example, surface 334 may bond to the inner wall of an irrigation conduit 250. Optionally, bonding surface 334 does not completely surround body 226. For example in some embodiments, bonding surface 334 has an arc shape. The connection between bonding surface 334 and the inner wall of the conduit optionally stabilizes the emitter. For example, bonding surface 334 may surround body 226 over an angular range of between 1 to 10 degrees and/or 10 to 30 degrees and/or 30 to 60 degrees and/or 60 to 90 degrees and/or 90 to 135 degrees and/or 135 to 180 degrees and/or 180 to 270 degrees and/or 270 to 350 degrees.

In some embodiments, inlet flow 190 enters inlet 260 and flows through a channel inlet into a channel 208. Optionally, channel 208 is tortuous, for example, including a meandering path and/or baffles. In the exemplary embodiment tortuous channel 208 winds around and/or is confined on one side by an outer cylindrical surface 220 of body 226. Channel 208 is optionally confined on an opposite side by an inner cylindrical surface 222 of cover 224. Optionally, the fluid optionally passes through a channel outlet through a wall 287*b* into a regulatory chamber 256. In some embodiments, the flow optionally exits regulatory chamber 256 out a regulator outlet 232 into an outlet chamber 206. For example, regulatory chamber may an open faced indentation in the outlet face of body 226. The open face of outlet chamber 206 is optionally closed by bonding (for example welding) a sealing surface 234*d* of wall 287*a* against an inner wall on irrigation hose 250. Optionally flow exits outlet chamber 206 out an opening 259 in the conduit as outlet flow 291.

Figure 4:
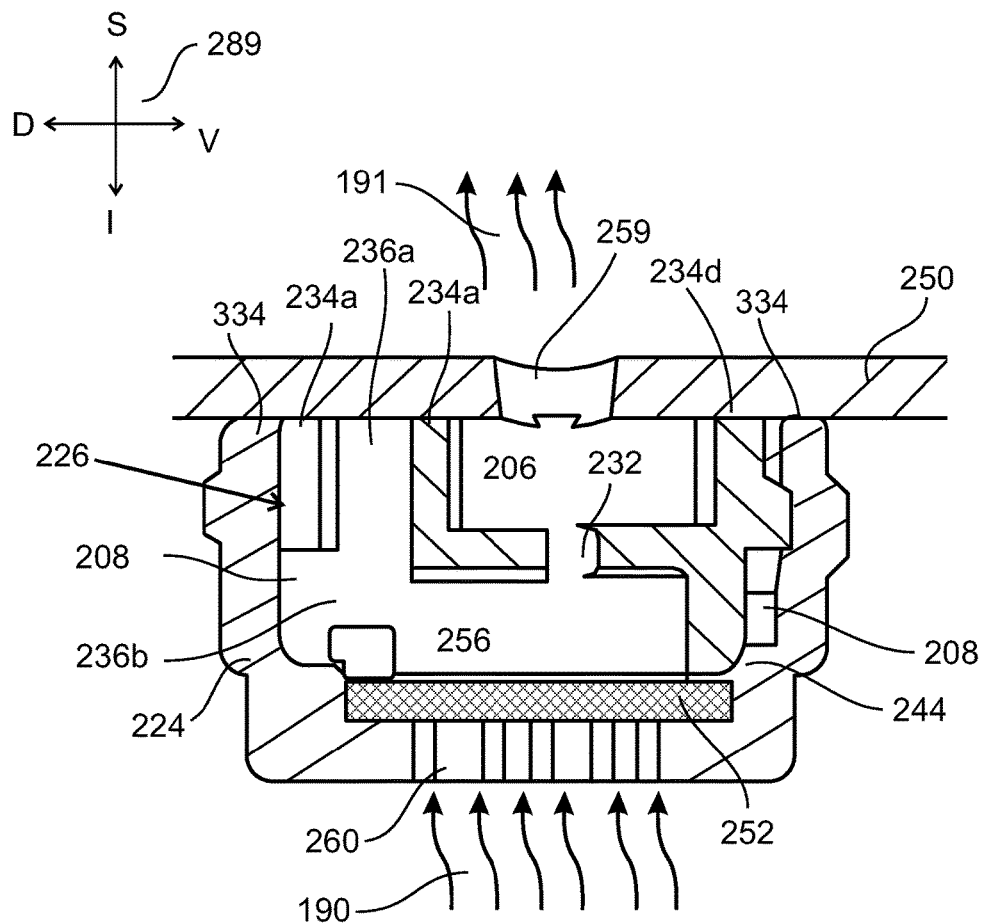
FIG. 4 illustrates an offset section view cut along line C-B of FIG. 11 of an emitter attached to a hose wall in accordance with an embodiment of the current invention.
Figure 5:
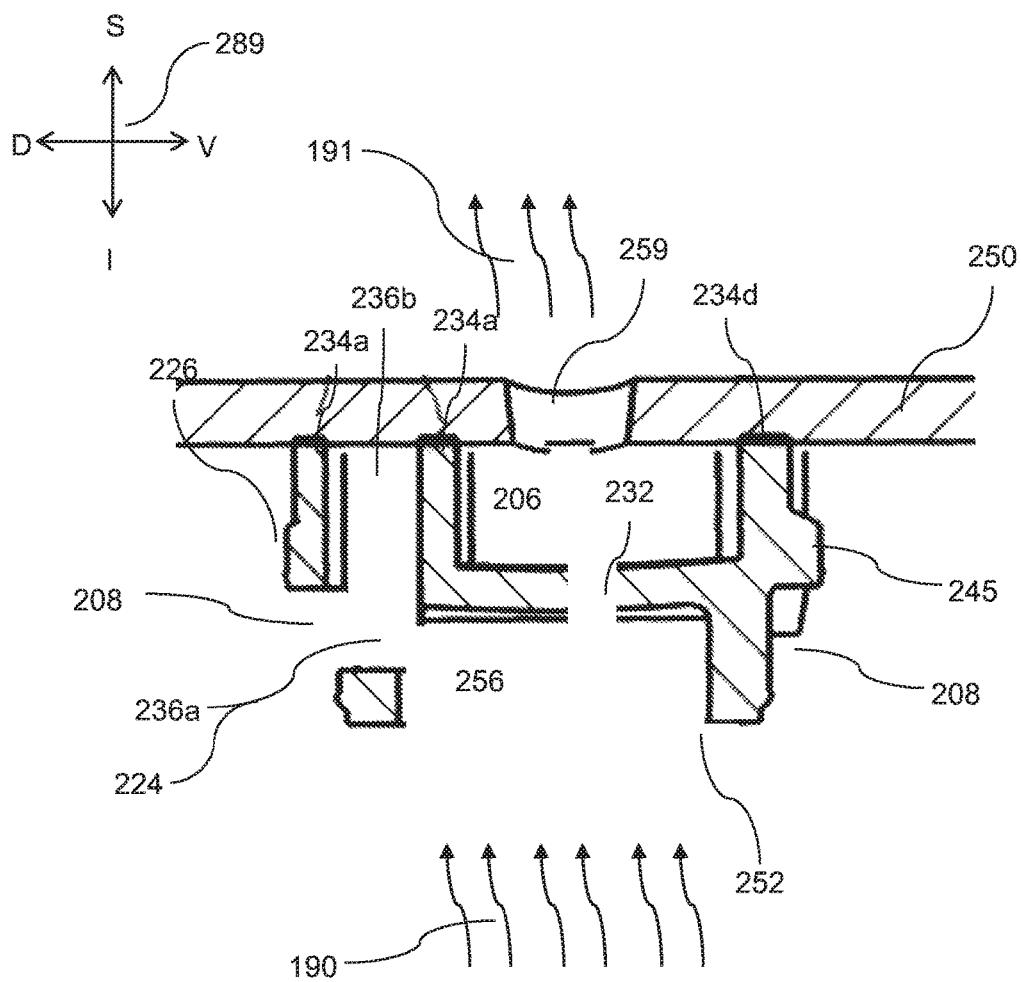
FIG. 5 illustrates an offset section view cut along line C-B of FIG. 11 of an emitter body attached to a hose wall in accordance with an embodiment of the current invention.
Figure 5:
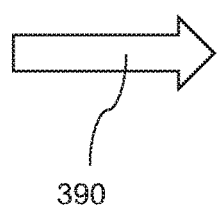
Figure 5:
Figure 11:
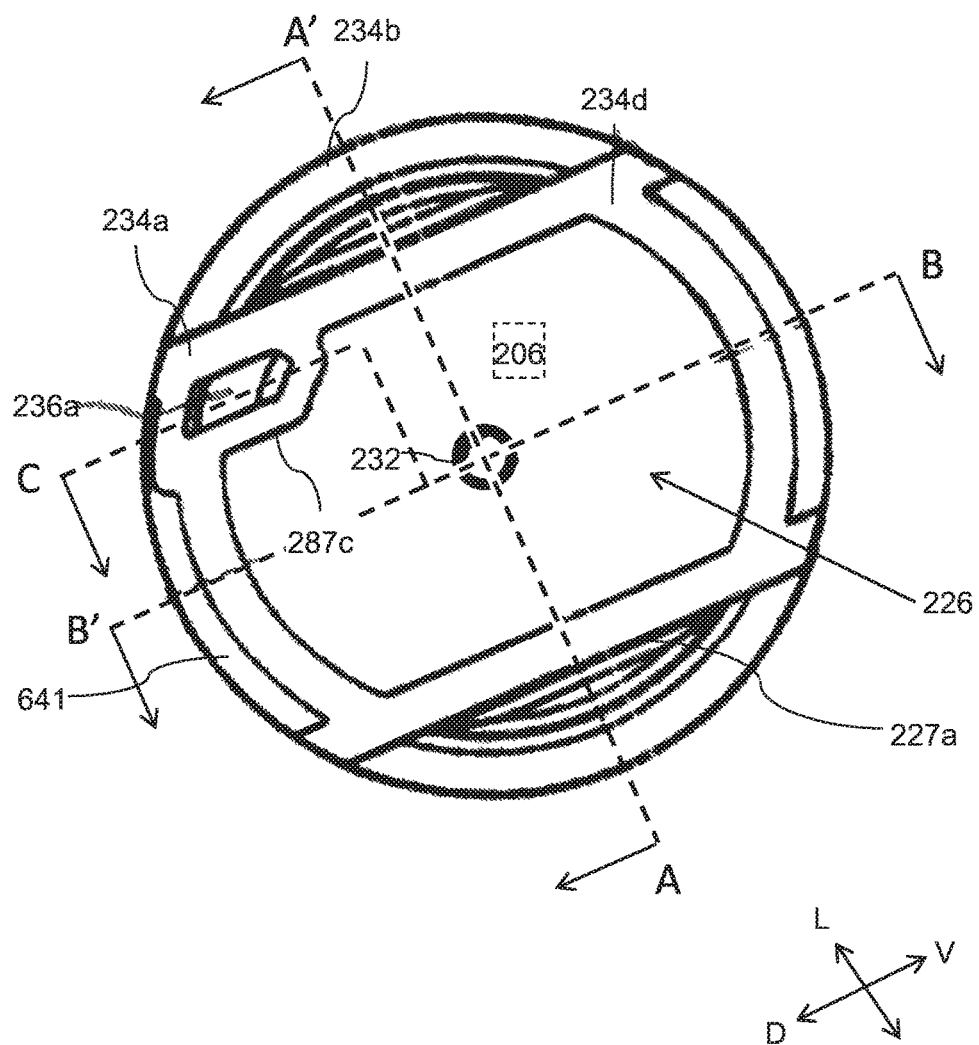
FIG. 11 is an outlet end view of an emitter body in accordance with an embodiment of the present invention.

FIGS. 4 and 5 illustrate offset sectional views cut along line C-B of FIG. 11 of an emitter to a hose wall in accordance with an embodiment of the current invention. In FIG. 4 it is seen that opening 236*b* optionally provides fluid communication between pressure reducing pathway 208 and regulator chamber 256. It is seen that when attached to a wall of an irrigation hose 250, shaft 236*a* is optionally a dead end fluid path that does not interfere with flow.

In some embodiments, a passage 236*b* passing laterally through a wall section 287*b* is formed by a molding elements moving longitudinally (in the anterior-posterior direction) with respect to each other. For example, access channel 236*a* is formed by a projection from an outlet side molding element passing from the anterior (outlet face) in the posterior direction through thick portion of wall section 287*a*. At the thin wall section 287*b*, the projecting element cuts out the entire thickness of the wall in an anterior portion thereof, leaving passage 236*b* laterally across the width of the wall.

In some embodiments, an inlet side mold element optionally includes walls defining an outer boundary of the inlet face of body 226. An inward projection optionally forms regulator chamber 256. For example, a narrow hollow forms narrow wall section 287*b*. For example, the thickness of the projection of the outlet mold portion is substantially equal to the thickness of the hollow in the inlet mold portion forming wall section 287*b*. For example, in the area where the projection of the inlet mold section enters hollow of the outlet mold section, the entire hollow is filled, preventing molding resin from entering the area during molding forming a hole in the final product (e.g. passage 236*b*). Optionally a projection from a molding element may have a more complex shape and/or may contact more complex hollows and/or other projections from other elements. Alternatively or additionally, the hollows and/or various parts of the molds and walls may have non-uniform thickness and/or width. Alternatively or additionally, there may be multiple hollows and/or projections coming from either and/or both mold parts. For example, more complex structures may be formed.

Emitter Core and Cover

Figure 6A:
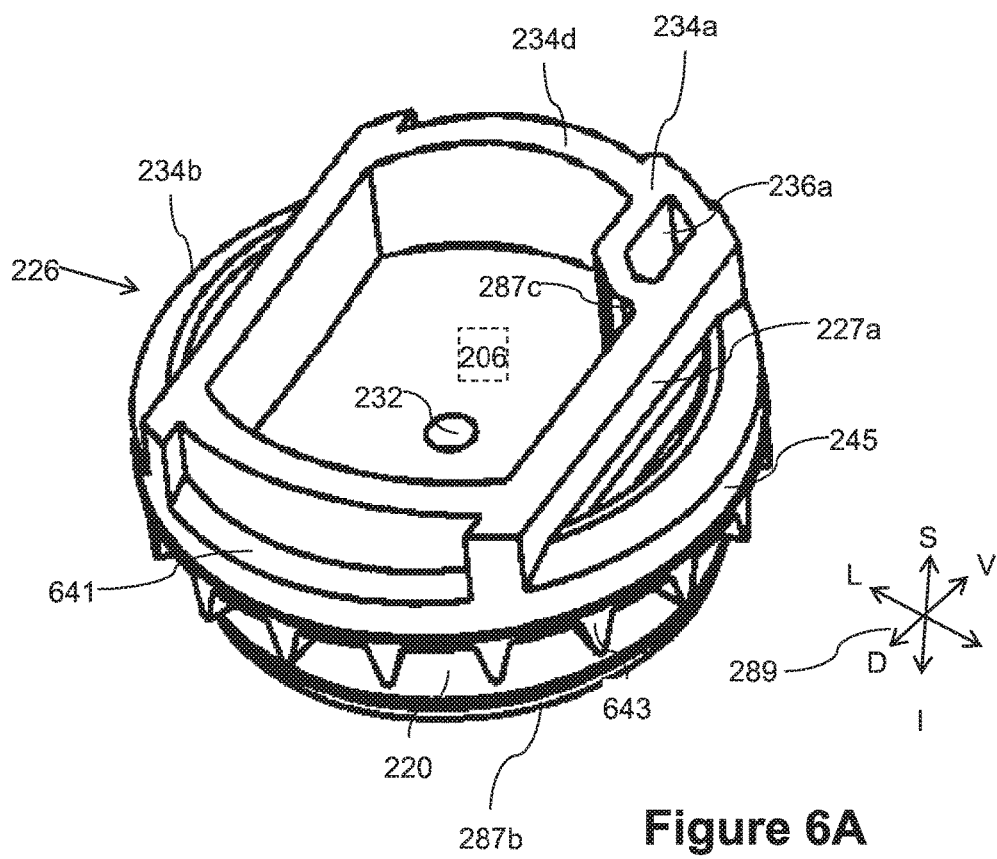
FIG. 6A is a perspective view of an outlet end of a dripper core in accordance with an embodiment of the present invention.

FIG. 6A is an outlet view of a superior side of body 226 in accordance with an embodiment of the current invention. Optionally, a device with flow paths in differing directions and/or perpendicular directions is molded using molding elements moving along a single axis. For example, two chambers may be separated by a wall. A flow path is optionally formed along an axis through the wall, for example to allow flow from outside to inside of a chamber. Optionally, the flow path may include an opening in the wall. Optionally the opening is formed by a molding element inserted into the mold, for example during formation of the wall. Optionally, the mold element may be inserted and/or removed by movement in a direction different from and/or perpendicular to the direction of the flow path. For example the hole may be formed in the base of the wall. After molding, the base and/or face of the wall may be sealed by a sealing element (for example a face of a dripper may be sealed against an inner wall of a conduit. The resulting opening optionally includes a flow path through the wall in a direction different from and/or perpendicular to the movement direction of the molding element. For example, the direction of the axis of mean flow may differ from the axis of movement of the molding by between 10 to 30 degrees and/or between 30 to 45 degrees and/or between 45 to 60 degrees and/or between 60 to 90 degrees.

Figure 6B:
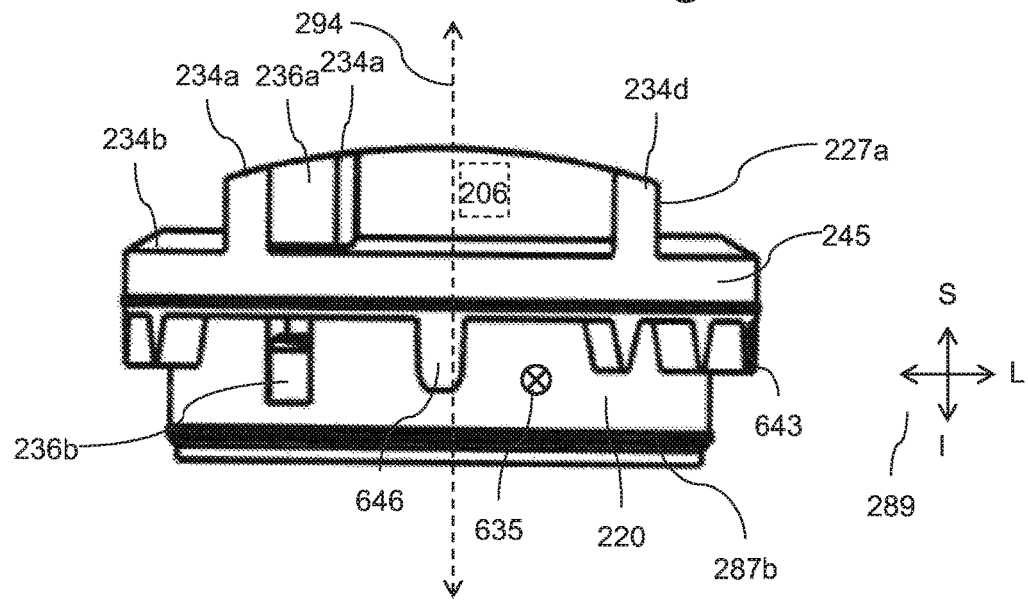
FIG. 6B is a side view of an emitter body in accordance with an embodiment of the present invention.
Figure 9:
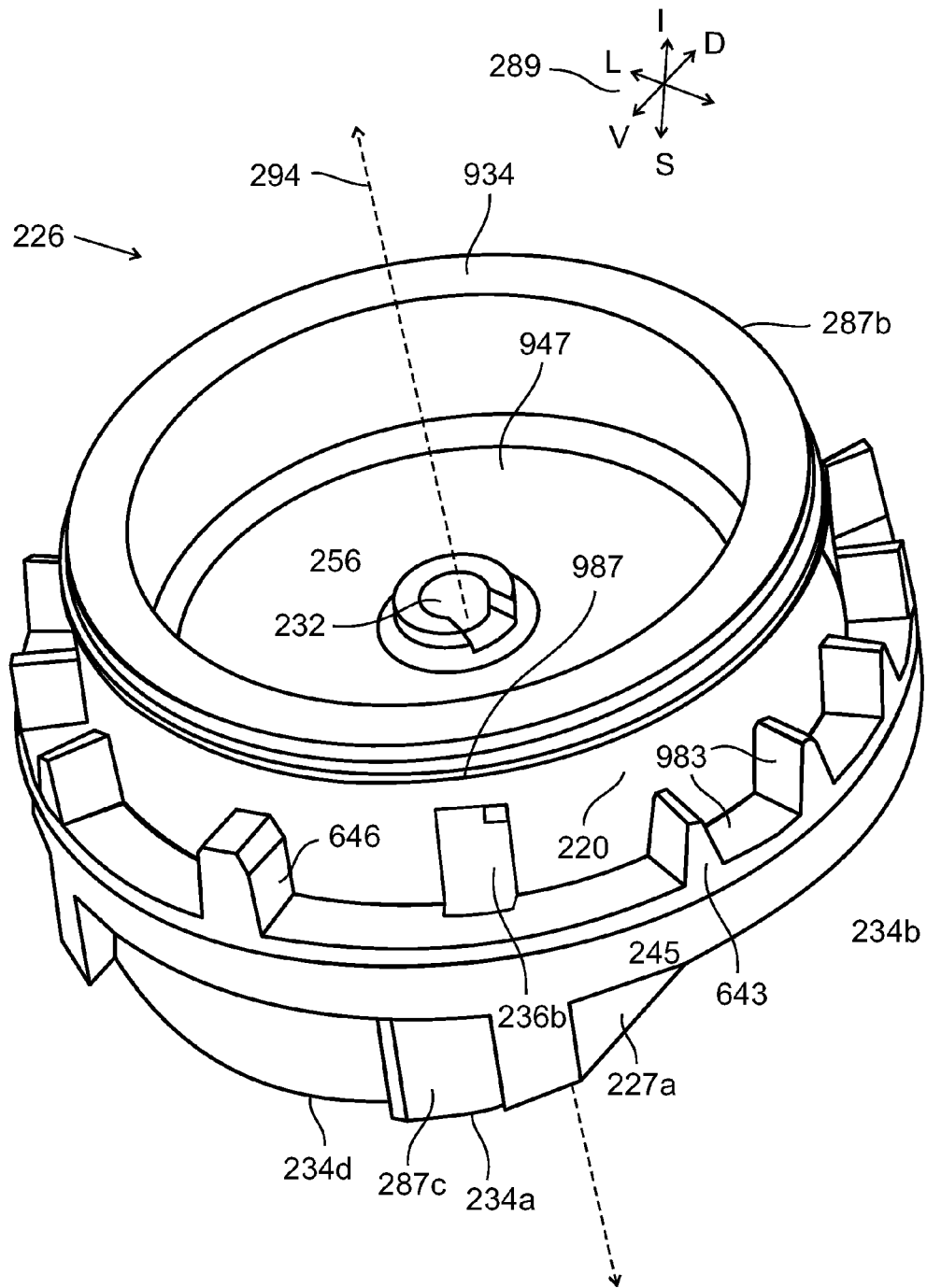
FIG. 9 is a perspective view of an inlet end of an emitter body in accordance with an embodiment of the present invention.

In some embodiments, body 226 is molded moving one or more mold elements along a single axis and/or in a single direction. For example the molding elements may move with respect to each other along the axis. For example, channel outlet opening 236*b* (e.g. for fluid flow in a lateral direction between a labyrinth flow path and regulating chamber as illustrated in FIG. 6B and FIG. 9) may be formed by a molding element moving in the superior—inferior direction. For example, a molding element may be inserted from a superior edge (e.g. edge 234*a*) in the inferior direction to form a channel 236*a*. Channel 236*a* optionally includes a void space located superior to the wall 287*b* of inlet chamber 256. The superior face of the void is optionally the insertion gap through which the molding element is inserted and/or removed. Optionally, to the depth to which the molding element is inserted inferiorly into wall 287*b*, it leaves an empty space in wall 287*b*. For example, the empty space may include a passageway 236*b*. The superior side of passageway 236*b* may, for example, be connected to an access channel 236*a*. Access channel 236*a* is optionally separated (e.g. by wall 287*c*) from outlet chamber 206. The superior face of access channel 236*a* and/or outlet chamber 206 is optionally sealed by an inner wall of an irrigation hose. For example, FIG. 4 illustrates an inner surface of an irrigation conduit 250 sealing the superior face of the dripper. For example, the inner surface of irrigation conduit 250 may seal access channel 236*a* closed and/or seal outlet chamber 206 optionally around hole 259. Optionally, the inner surface of irrigation conduit 250 may seal to sealing surfaces 234*a*-234*d* and/or separate access channel 236*a* from outlet chamber 206. Optionally sealing the superior face blocks fluid flow between access channel 236*a* and outlet chamber 206 except when fluid passes through passageway 236*b* and/or regulating chamber 256. Fluid entering opening 236*b* from pressure reducing flow path 208 optionally can only exit to regulation chamber 256. For example the mean flow direction in opening 236b (from the labyrinth flow path to regulation chamber 256) is perpendicular to the molding direction (e.g. the longitudinal superior-inferior direction). Optionally, passageway 236b does not reach the inferior (inlet) edge of wall 287b. For example, the inferior edge of wall 287b may be a fully closed rim (for example as illustrated in FIG. 9). Optionally the rim of the regulator chamber is sealed against a flexible diaphragm 252, for example as illustrated in FIG. 2.

In some embodiments, access channel 236a and/or passageway 236b are separated from outlet chamber 206 by a wall 287c. For example wall 287c is formed in the space between the molding element that form outlet chamber 206 and the molding element that forms passageway 236b. For example, passageway 236b may supply fluid communication between a regulating chamber 256 (for example as illustrated in FIG. 9) and a labyrinth flow path 208 circling around wall 287b.

In some embodiments, baffles (for example teeth) may project into a fluid pathway. For example, teeth 643 project into pressure reducing flowpath 208. Optionally, teeth 643 cause increase flow resistance and/or cause flow to meander and/or increase tortuosity along flowpath 208. For example, teeth 643 may be interspersed between other baffles to form a torturous path. In some embodiments, teeth 643 project laterally outward from an outer side surface 220 of body 226.

In some embodiments various features on body 226 are configured for easy molding. For example, external features molded on the inferior side of a molding divide may be designed to facilitate removal of a mold in an inferior direction. For example undercuts may be avoided and/or there may be no significant undercuts on the superior side of features on the inferior face of the body. For example, external features molded on the superior side of a molding divide may be designed to facilitate removal of a mold in a superior direction. For example undercuts may be avoided and/or there may be no significant undercuts on the inferior side of features on the superior face of the body. For example a bounding base (for example sealing ring 245) may divide between a superior face and an inferior face. Where an undercut feature occurs in a face, it may be formed with a channel leading toward an opposite face. For example, passageway 236b may be formed in an inferior face by a projection on a molding element projecting from the superior face to the inferior face of body 226.

In some embodiments, teeth 643 project in the inferior direction from an inferior side of sealing ring 245 of body 226 (e.g. towards the inlet face of body 226). For example, protruding features (for example between teeth 643) may be convex in the inferior direction and/or hollow features (for example spaces between teeth 643) may be concave in the superior direction. Body 226 optionally includes features for connection to a cap. For example body 226 includes a ledge 641. Optionally, snap on cap 224 lock to ledge 641.

FIG. 6B is a side view of an emitter body in accordance with an embodiment of the present invention. In some embodiments, a divider may prevent short circuiting of a pressure reducing flow path in accordance with an embodiment of the current invention. For example, divider 646 protrudes across flow path 208 on a short circuit between an inlet channel location (marked by a symbol 635) and an outlet (for example passageway 236b) where flow exits pressure reducing pathway 208 to a regulating chamber 256.

Figure 7:
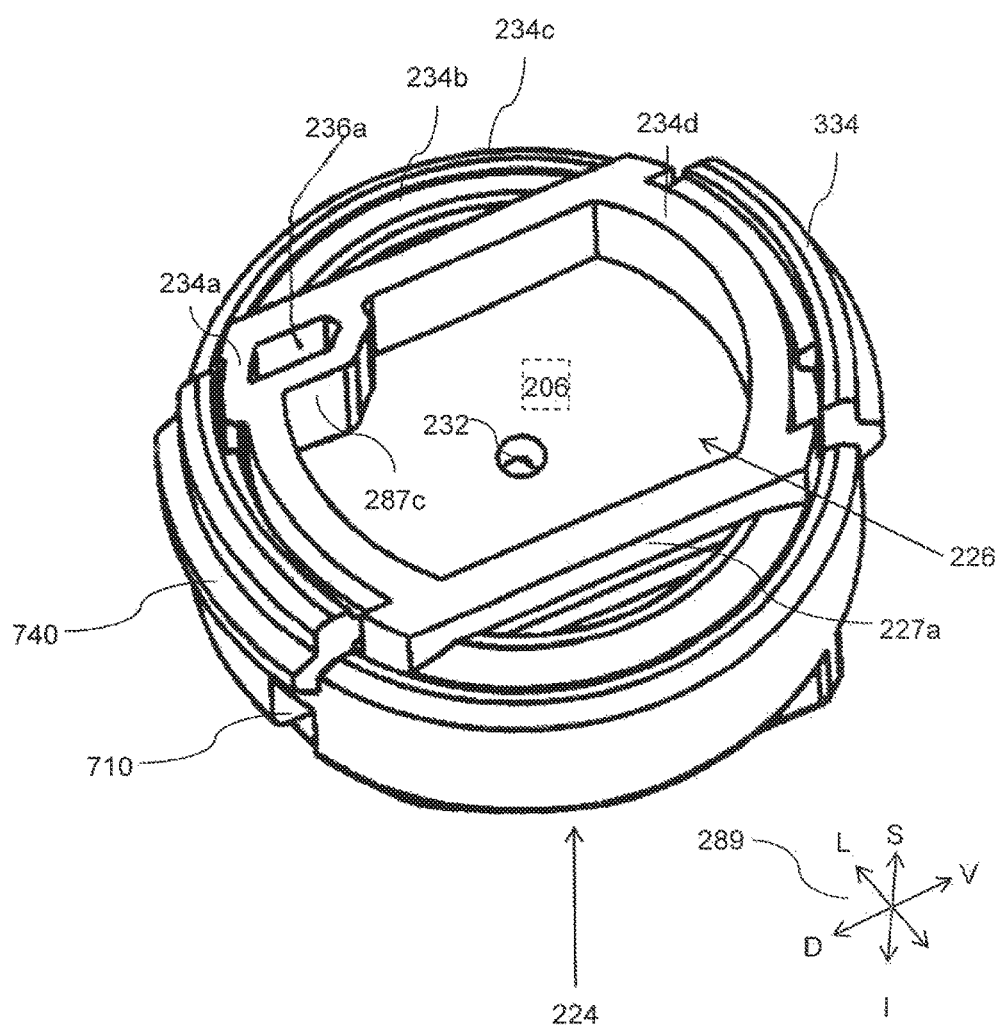
FIG. 7 is a perspective view of an outlet end an emitter in accordance with an embodiment of the present invention.

FIG. 7 is a superior perspective view of a flow restrictor in accordance with an embodiment of the present invention. In some embodiments, snaps and/or interference elements may connect cover 224 to body 226. For example, snap arm extensions 740 on cover 224 snap onto a ledge 641 on body 226. In some embodiments a fluid entrance of cover 224 may include a side opening 710.

Figure 8:
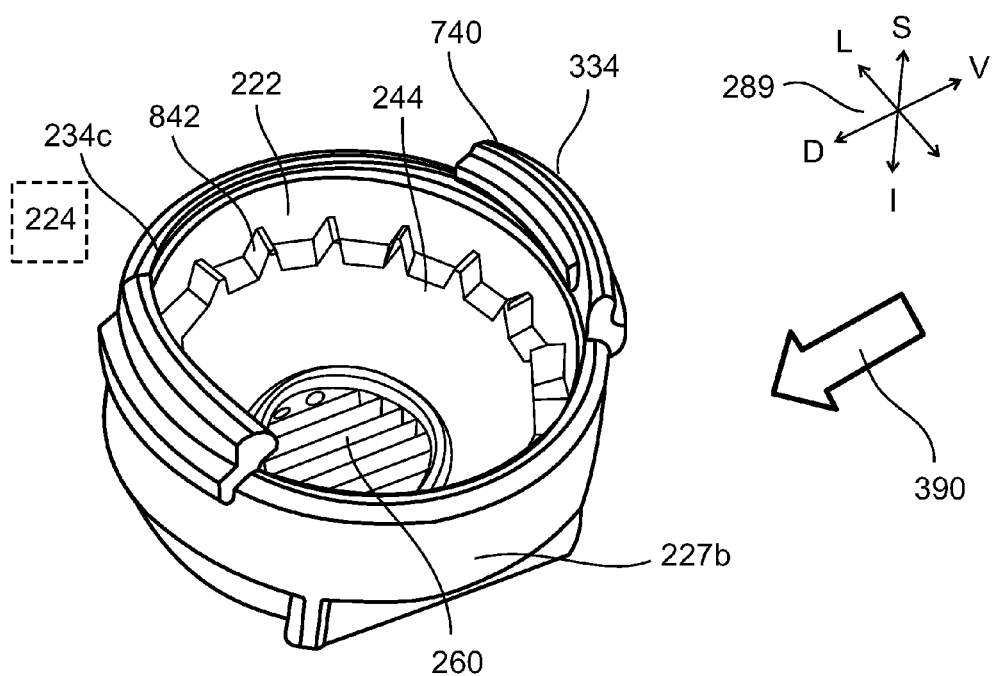
FIG. 8 is perspective view of an emitter cover in accordance with an embodiment of the present invention.

FIG. 8 illustrates a superior perspective view of a flow restrictor cap (for example cover 224) in accordance with an embodiment of the present invention. The inferior face of cover 224 is optionally open. For example, flow enters the emitter through the inferior face of cover 224. Alternatively or additionally the inferior side of a cover may be substantially sealed. For example, all fluid entering a cover may be through a side inlet (for example inlet 710).

In some embodiment a cap may include a cylindrical hollow. Optionally, the hollow fits over the inferior end of the cylindrical body 226. Optionally, the cap includes a bounding base (for example a sealing ring 244). For example, when cover 224 is installed onto body 226, sealing ring 244 define an inferior boundary of flow path 208. For example, sealing ring may seal against surface 220 to confine fluid inside flow path 208. For example fluid may be confined between surface 220 of body 226 and surface 222 cover 224 and/or between ring 244 of cover 224 and ring 245 of body 226.

In some embodiments, cover 224 may include baffles (for example a set of teeth 842) projecting inward from inner side surface 222 of the cylindrical hollow. Optionally, cover 224 may be designed for easy molding. For example there may be no substantial undercuts against a molding direction. For example, the cylindrical hollow of a cap may be molded by a molding element that separates from the cap in a superior direction. In some embodiments, teeth 842 protruding inward from surface 222 may project in the superior direction from sealing ring 244. For example, protruding features (for example between teeth 842) may be convex in the superior direction and/or hollow features (for example spaces between teeth 842) may be concave in the inferior direction.

In some embodiments, when cover 224 is aligned to and/or placed over body 226 teeth 842 and teeth 643 may form a torturous path in the flow path 208. For example, teeth 842 may intervene between teeth 643 forcing flow to wind around the teeth. For example, fluid may enter flow channel 208 through inlet channel, wind around surface 220 while meandering around and/or between teeth 842 and/or 643 and/or exit flow path 208 through passageway 236b to regulation chamber 256. For example passageway 236b may provide fluid communication between regulating chamber 256 and a space between teeth 842 and teeth 643 and/or flow path 208.

In some embodiments, a cover may include an orientation indicator. Optionally, an orientation indicator may include a flat surface 227b on an outer surface of cap 224 indicating an orientation of said cap. For example, and orientation indicator may indicate an orientation around a longitudinal axis of said cylindrical hollow. For example, parallel flat surfaces 227b may optionally serve as orientation indicator. For example, the flat surface of orientation element 227b may be aligned with the axis of the conduit. Alternatively or additionally, the orientation element may be used during assembly for example to orient cover 224 with body 226. Optionally other alignment indicators may include a snap 740 and/or a protrusion.

In some embodiments, orientation of cover 224, body 226, conduit wall 250 and/or the alignment between them may be of importance. Alignment may optionally be achieved using automatic machinery. Alignment may optionally be facilitated by various orientation elements and/or alignment indicators.

Optionally, cover 224 is shaped and sized for attachment to an inner wall of an irrigation conduit. For example, attachment surfaces 234c and/or 334 of cover 224 may be positioned and/or configured to fit to and/or be attached to the inner wall of a hose when cover 224 is attached to body 226 and attachment surfaces 234a, 234b and 234d of body 226 are connected to the inner wall of the hose. For example, a surface may be positioned to fit the curvature of the inner wall of the hose. For example surface 234c which is intended to be laterally further from the longitudinal axis of the hose (for example is further from the central dorsoventral axis of cover 224) may be located in an inferior position to a surface 334 which is intended to be located near the longitudinal axis of the hose. In some embodiments, a bonding surface is optionally flat. When bonding to an inner surface of a hose, boding surfaces may distort the conduit. In some embodiments distortion may change the shape of the conduit, for example the diameter, less than 5%. Alternatively or additionally, cover may not be bonded to conduit wall. Optionally, attachment surface 334 surrounds at between 0 to 20% and/or more than 20% of a circumference of body 226 when cover 224 is positioned over the lower end of body 226 and/or no more than 60% of a circumference of body 226.

In some embodiments, cover 224 includes an interlocking divider on surface 222. For example, a divider optionally prevents fluid that enters the beginning 208' of channel 208 from short circuiting pressure reducing flowpath 208 by flowing directly to passageway 236b without traversing the far end 208" of the flowpath. For example, divider may be protrude from surface 222 and/or seal against surface 220 when body 226 is inserted into cover 224. Optionally a divider on cover 224 interlocks with divider 646 on body 226. For example, interlocking dividers may block short circuiting flow. Interlocking dividers may be orientation locking elements. For example, when dividers are locked together they optionally lock surface 220 into proper rotational alignment with surface 222. Locking surface 220 into rotational alignment with surface 222 may optionally facilitate the proper intermeshing of teeth 842 and 643. Locking surface 220 into rotational alignment with surface 222 may optionally align a channel inlet 235 groove in cover 224 with the inlet portion 208' on body 226.

In some embodiments, input channel 235 may be formed in cover 224. For example, channel 235 may include an open faced groove. When the emitter is assembled, body 226 and/or membrane 252 optionally seal across the open face of the groove to form a closed channel. Fluid entering side opening 710 and/or or inlet 260 optionally passes through channel 235 to the beginning 208' of flow path 208 and/or flows around the inside of surface 222 of cover 224 (for example between surface 222 and surface 220 of body 226 and/or winds around teeth 643 and/or 842). When the fluid reaches the end 208" of the pressure reducing flowpath 208 fluid optionally flows through passageway 236b into regulator chamber 256 of body 226.

In some embodiments inlet 260 includes a filter. For example, inflowing water may pass through grooves sized to permit water to pass through inlet 260 while preventing particles from passing through inlet 260.

In some embodiments orientation indicators may be provided. For example, an orientation indicator 227a may be included on body 226 and/or an orientation indicator 227b may be included on cover 224. When assembling the emitter, an assembly machine may align orientation indicator 227b on cap 224 with orientation indicator 227a on body 226. For example, alignment of indicators 227a and 227b may indicate alignment of dividers of the cover and body and/or of teeth 842 to teeth 643. Indication of proper alignment may be used by a production machine.

FIG. 9 is an inferior perspective view of body 226 in accordance with an embodiment of the current invention. Optionally, the top edge of regulation chamber 256 includes a full sill 934 surrounding regulation chamber from all sides. For example, sill 934 includes a lintel 987 over passageway 236b. In some embodiments, when the emitter is assembled, membrane 252 is sandwiched between sill 934 and the inside face of cover 224. For example, the full sill 934 seals to membrane 252 and/or inhibits leaking of inlet flow and/or inhibits short circuiting by fluid of pressure reducing flowpath 208 to reach regulation chamber 256.

In some embodiments a superior surface 947 of regulation chamber 256 may be flat and/or planar. Alternatively or additionally surface 947 may be domed to better match the shape of membrane 252 when it is bowed by pressure increasing resistance in chamber 256. Alternatively or additionally, surface 947 may include protrusions and/or indentations and/or channels. A superior surface 983 of the inferior boundary of a labyrinth flow path is illustrated.

In some embodiments, a drip emitter and/or a component thereof and/or features thereof are molded without undercuts. For example, the component is removed from a mold without flexing and/or with all movement along a single axis 294. For example, body 226 is formed with straight molding elements (e.g. having all protrusions aligned to the molding direction) moving along an axis 294 of body 226. For example, every surface of body 226 has an uninterrupted path in the direction of the axis to beyond an end of the device. For example, each surface is a either an end of body 226 (for example either the superior end and/or the opposite inferior end) (for example surfaces 934, 947, 983 are faces of the superior end of the device in that they face the superior direction and have an interrupted direct path parallel to axis 294 in the superior direction beyond the end of body 226) or is parallel to axis 294 and has an interrupted path beyond the end of the device (for example surface 646, the inner wall surface of outlet 232 and/or the cylindrical surface 220 have an uninterrupted path in the superior direction and/or surfaces of wall 287c and/or of indicator 227a have an interrupted path in the inferior direction). For example, the inner surfaces of passage 236b, which from a superior view appears to be an internal surface of wall 220, optionally have an interrupted path in the inferior direction for example via access shaft 236a. For example, molding element moving parallel to axis 294 may have uninterrupted access to every surface of body 226 including passage 236b.

Figure 10:
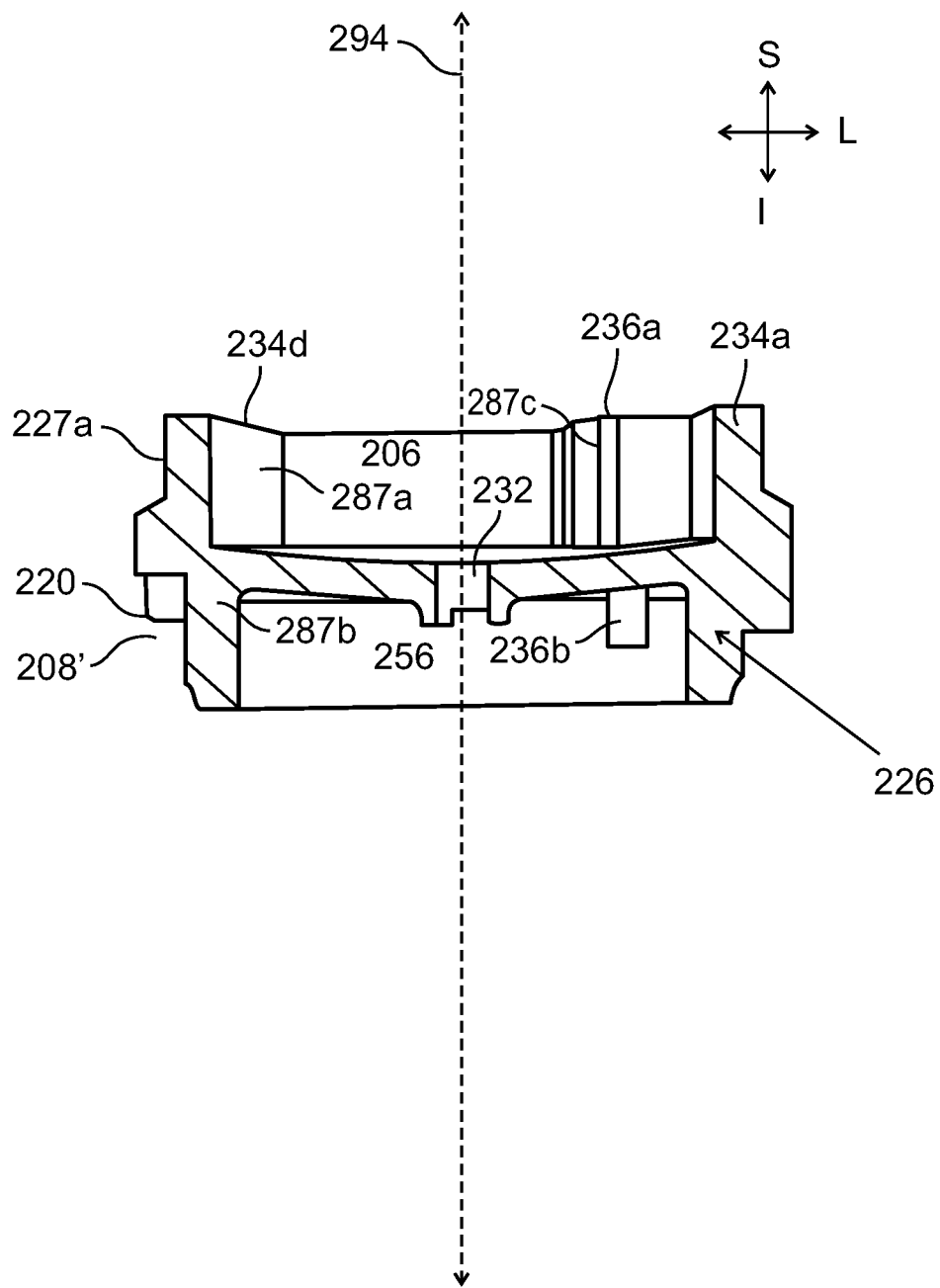
FIG. 10 is a cross sectional view of an emitter body in accordance with an embodiment of the present invention.

FIG. 10 is a cross sectional view of a dripper body in accordance with an embodiment of the present invention.

FIG. 11 is an outlet end (superior) view of a dripper body in accordance with an embodiment of the present invention. Cutting planes of cross sectional views are illustrated.

General Aspects of Some Embodiments of Drip Emitters

Emitters may be divided into various categories. One exemplary kind of emitter is an in line emitter which may be installed into a conduit (for example an irrigation hose) during manufacture. One exemplary kind of emitter is an in line emitter which may be added to a conduit after manufacture. In line emitters may include embedded restrictors. For example, an embedded restrictor may be attached to less than half the circumference of the conduit. In line emitters include cylindrical inserts that are attached to the entire inner circumference of the conduit and/or at least half of the inner circumference of the conduit. In line emitters may include embedded emitters that may be embedded into the wall of a conduit. For example the majority of the thickness of an embedded emitter may protrude out from the inner passageway of the conduit.

In line drippers may include flat emitters that are attached to a small portion of the inner circumference of the conduit. Such drippers often have an elongated rectangular form. The majority of the thickness of the emitter may protrude into the inner pathway of the conduit. Emitters may be further divided according to whether they include a self-contained flow restrictor. A self-contained flow restrictor is not dependent on connection to a conduit wall. Conduit dependent flow restrictors may depends on connection to a conduit wall. For example a conduit dependent flow restrictor may include a pressure reducing labyrinth which employs the conduit wall to confine a labyrinth flow restrictor.

Self-contained button emitters (sometimes referred to a cylindrical emitters and/or disk emitters) may be used as on line emitters. Self-contained button drippers may have significant advantages. For example button drippers may include a labyrinth flow path confined by and/or between two cylindrical surfaces. In some embodiments tight sealing cylindrical surfaces can be formed from molded plastic. For example, an initial labyrinth flow path may be formed between two plastic cylindrical surfaces without an expensive flexible membrane and/or gasket. In some embodiments of a button dripper a small flexible membrane may cover only the regulating portion of a flow restrictor. This may save production costs compared to, for example, elongated emitters that in some cases may use a larger membrane to cover and/or seal various portions of the flow restrictor, for example including an initial labyrinth.

The external casing of a button type flow restrictor may be symmetrical about an axis. Many conventional button drippers include an outlet that is also symmetrical around the same axis as the flow restrictor. For example, conventional outlets may have a flat and/or dome shape. There may be a problem bonding a flat surface or a circular dome surface to a cylindrical inner wall of a conduit.

There have been attempts to bond flat or domed button dripper to the inside of a conduit is by locally deforming the conduit and or embedding the emitter mostly and or entirely into the wall of the conduit. Embedding an emitter and/or deformation of the conduit may lead to problems, for example changes in the external properties of the conduit, for example the wall strength, the external cross section, the flexibility, the ability of the conduit to coil. Embedded emitters may require thick walled conduits. Deformation and its associated problems may be increased for larger self-contained emitters. Smaller, conduit dependent flow restrictors may be unreliable and/or inconsistent. For example bonding between a conduit dependent flow restrictor and a hose wall may be less precise and/or reliable than molding of plastic parts.

In some embodiments of the present invention the button dripper may include a coupler including an outlet zone with a vaulted and/or arched profile. The arched profile may not have radial symmetry around the same axis as the button flow restrictor. For example, the outlet zone may be arched to conform to a cylindrical inner surface of a hose.

In some embodiments of the present invention, a self-contained button flow restrictor may be joined to a coupler for connection to the wall of a conduit as an in line emitter. The self-contained button flow restrictor may optionally produce reliable flow without being sensitive to the quality and/or depth of bonding to a conduit. The coupler may optionally include a surface that facilitates alignment and/or bonding to a conduit wall and/or produces an outlet zone that is suited to perforation by automated machinery. The coupler may optionally bond to the wall without significantly changing the external properties of the conduit.

In some embodiments the fluid outlet of the coupler may be shaped to match the inside curvature of the conduit wall. For example, the fluid outlet may include a rim and/or a bonding surface arched to lie on a virtual cylindrical surface. The virtual surface may match the inner cylindrical surface of the conduit. Optionally the coupler surface may bond to less than less than half of the circumference of the conduit. Optionally, fitting the outlet to the curvature of the conduit may allow a larger outlet zone and/or bonding surface with less disturbance to the external properties of the conduit.

In some embodiments an irrigation hose may include a plurality of in hose drip emitters. Optionally, the hose may retain flexibility (for example the bonding zone may be configured so as to not constitute a large inflexible zone). Optionally, the hose may retain a smooth outer geometry, allowing it to be handled and/or stored like conventional hoses. For example the hose may bend enough to be rolled in a standard manner.

In some embodiments, the outlet zone may be suitable for perforation by automated machinery. For example the outlet zone may optionally range between 200 to 500% larger than perforation size. Drippers may be spaced between 100 and 1000 mm apart. The outlet zone may allow for 0.5-2.0% misalignment, which may be useful in automatic perforation. For example the outlet zone may have a width ranging between 2 mm and 10 mm and/or the outlet zone may have a width ranging between 3 mm and 7 mm. For example the zone may occupy an angular extent of less than 20° on the circumference of the conduit. For example the installation of the emitter may change the width of the conduit by less than 5%. Perforation may include for example punching, slicing, cutting and or other technologies.

In some embodiments the dripper may be installed in a hose having an inner diameter of between 5 to 30 mm. For example the dripper may be installed in a hose having a wall thickness of between 0.1 to 4 mm, and more particularly in some embodiment the dripper may be installed into a thin walled hose having a wall thickness of between 0.1 to 1.0 mm. For example the hose with the drippers may have a working pressure range of between for example ranging between 1 to 3 atm or alternatively for example ranging between 0.2 to 4 atm.

In some embodiments the output is regulated in hose drip emitter. For example, the emitter may preserve a substantially constant flow rate ranging between 0.2 to 8 l/hr. For example, it may preserve a constant flow rate of about 0.5, 1, 2, 3, 4, or 8 l/hr. For example, the emitter may preserve the specified output flow rate to ±10% under variations of input pressure ranging between for example 1 to 3 atm or alternatively for example ranging between 0.2 and 4 atm, for example due to changes of elevation along the conduit and/or transient pressure changes and/or changes in pressure along the conduit (due for example to head loss along the conduit). The emitter may optionally include a one way valve to prevent back flow.

In some embodiments, a component (for example an outlet coupler and the body) of the flow restrictor may be produced in a single piece of molded plastic. Optionally a bonding surface between the coupler and the inner wall of the conduit may perpendicular to an axis of the flow restrictor. Optionally, the outlet zone and/or the bonding zone may be thinner that the flow restrictor. Optionally, the flow restrictor may be disk and/or cylindrical and/or conical in shape. Optionally the flow restrictor may include pressure compensation.

Some embodiments relate to a two part labyrinth. Optionally baffles on each part of a two part labyrinth may be oriented in a single direction. In some embodiments, when assembled together two relatively simple parts may provide a winding labyrinth of baffles having different orientations.

Mold extraction for plastic emitters parts may be made difficult by the inclusion of features having different extraction orientation in a single molded part.

For example extraction of conventional labyrinths from molds may be made slow and/or expensive due to the need for movement and/or flexing in multiple directions in order to extract baffles having different orientations. Some embodiments of a two part labyrinth may facilitate production of a labyrinth flow path by forming a labyrinth having baffles of differing orientations with easily molded parts wherein on a given part, feature have similar orientation.

The two part labyrinth may optionally be confined on opposing sides by two parts, for example body having a cylindrical outer surface and a cover having a cylindrical inner cavity.

Optionally intervening baffles on the two parts may form a winding fluid pathway. The fluid pathway may optionally circle the cylindrical surface. The fluid pathway may optionally wind along the cylindrical surface.

Alternatively or additionally, the cylindrical surface may include a conical portion and/or an irregular convex portion. For the sake of the description herein, cylindrical may include for example a truncated cone having an aperture of 0-10°. Optionally the directrix of the cylinder may not be circular.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

In some embodiments, a flow restrictor may include a flow limiting subassembly including for example a core and/or a cover. The flow restrictor optionally includes a fluid outlet coupler and/or a fluid outlet attachment and/or a fluid outlet chamber adapted for bonding to an outlet zone on an inside surface of a fluid conduit. Optionally the flow restrictor may be self-contained and/or button type and/or may include a pressure compensating regulator. Features disclosed in some embodiments of the current invention facilitate the aligning and/or bonding of a button dripper to a wall of cylindrical conduit with minimal disturbance to the exterior shape and/or properties of the conduit. In some embodiments, the outlet zone may be suitable for perforation by automated machinery. For example the outlet zone may optionally range between 200 to 500% larger than perforation size. Drippers may be spaced between 100 and 1000 mm apart in a conduit. The outlet chamber may allow for 0.5-2.0% misalignment, which may be useful in automatic perforation. For example the outlet chamber may have a width ranging between 2 mm and 10 mm and/or the outlet chamber may have a width ranging between 3 mm and 7 mm. For example the chamber may occupy an angular extent of less than 20° on the circumference of the conduit. For example the installation of the emitter may change the width of the conduit by less than 5%. Perforation may include for example punching, slicing, cutting and or other technologies.

In some embodiments the dripper may be installed in a hose having an inner diameter of between 5 to 30 mm. For example the dripper may be installed in a hose having a wall thickness of between 0.1 to 4 mm, and more particularly in some embodiment the dripper may be installed into a thin walled hose having a wall thickness of between 0.1 to 1.0 mm. For example the hose with the drippers may have a working pressure range between 1 to 3 atm or alternatively for example ranging between 0.2 to 4 atm.

In some embodiments the output flow rate of a flow restrictor is regulated. For example, the emitter may preserve a substantially constant flow rate ranging between 0.2 to 8 l/hr. For example, it may preserve a constant flow rate of about 0.5, 1, 2, 3, 4, or 8 l/hr. For example, the emitter may preserve the specified output flow rate to ±10% under variations of input pressure ranging between for example 1 to 3 atm or alternatively for example ranging between 0.2 and 4 atm, for example due to changes of elevation along the conduit and/or transient pressure changes and/or changes in pressure along the conduit (due for example to head loss along the conduit). The emitter may optionally include a one way valve to prevent back flow.

In some embodiments an outlet chamber and/or the body of the flow restrictor may be produced in a single piece of molded plastic. Optionally a bonding surface between the outlet chamber and the inner wall of the conduit may perpendicular to an axis of the flow restrictor. Optionally, the outlet chamber and/or the bonding zone may be thinner that the flow restrictor. Optionally, the flow restrictor may be disk and/or cylindrical and/or conical in shape. Optionally the flow restrictor may include pressure compensation.

It is expected that during the life of a patent maturing from this application many relevant technologies will be developed and the scope of the terms are intended to include all such new technologies a priori.

As used herein the term "about" refers to ±5%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. An inline dripper comprising:
   a cylindrical body having a longitudinal axis and including at an upper end thereof an attachment surface perpendicular the longitudinal axis; the attachment surface shaped and sized for attachment to an inner wall of an irrigation conduit;
   a first wall surrounding an outlet chamber on the upper end of the body;
   an upper edge of the first wall included in said attachment surface;
   a second wall below the first wall surrounding a regulator chamber; the second wall including an opening between an outside surface of the cylindrical body and the regulator chamber;
   a portion of the first wall above the opening being thicker than a portion of the second wall below the opening;
   a hollow shaft passing through the first wall from the attachment surface to the opening in the second wall, said hollow shaft separated from said outlet chamber by said first wall;
   a first set of teeth projecting laterally outward from the outside surface of the cylindrical body with spaces between teeth of the first set of teeth facing the lower end of the body, the lower end opposite the upper end;
   a cap including a cylindrical hollow fitting over the lower end of the cylindrical body; the cap including a second set of teeth projecting inward from a side wall of the cylindrical hollow with spaces between teeth of the second set of teeth facing upward when the hollow is positioned over the lower end of the cylindrical body; and
   wherein when said cap is positioned over said lower end of said cylindrical body, said opening provides fluid communication between said regulating chamber and a space between said first set of teeth and said second set of teeth.

2. The dripper of claim 1 further comprising:
   an inlet in the cap allowing water from the conduit to enter the hollow of the cap and reach the space between the first set of teeth and the second set of teeth.

3. The dripper of claim 1 further comprising:
   a membrane sized and shaped to fit between a bottom edge of said second wall and said cap;
   said membrane preventing short circuiting of water passing through to the regulating chamber without passing through said space between said first set of teeth and said second set of teeth.

4. The dripper of claim 1, further comprising:
   a first orientation element on said body and a second orientation element on said cap wherein an alignment of said first orientation element with said second orientation element indicates an alignment of said first set of teeth with said second set of teeth.

5. The dripper of claim 1, wherein when said attachment surface is sealed against said inner wall of said irrigation conduit, every fluid path from said hollow shaft to said outlet chamber goes through said opening in the second wall.

6. The dripper of claim 1, wherein said space between said first set of teeth and said second set of teeth is configured to reduce pressure of flow passing through said space into said regulating chamber.

7. The dripper of claim 1, wherein when said attachment surface is sealed against said inner wall of said irrigation conduit, every fluid path from said hollow shaft to outside said dripper goes through said opening in the second wall.

8. The dripper of claim 1, wherein said hollow shaft is straight.

9. The dripper of claim 1, wherein fluid communication between said space between said first set of teeth and said second set of teeth and said outlet chamber passes axially through the cylindrical body.

10. The dripper of claim 1, wherein said space between said first set of teeth and said second set of teeth at least partially encircles an outer wall of said cylindrical body.

11. The dripper of claim 1, wherein said second wall is an outside wall of said cylindrical body and comprises an outer curved surface constituting said outside surface of said cylindrical body.

12. The dripper of claim 1, wherein said teeth are convex in the inferior direction.

* * * * *